(12) United States Patent
Oki

(10) Patent No.: US 6,808,142 B2  
(45) Date of Patent: Oct. 26, 2004

(54) AIRCRAFT WITH A PLURALITY OF UPPER AND LOWER CABINS FUNCTIONING AS CARGO COMPARTMENTS OR PASSENGER CABINS AND METHOD OF LOADING CARGOS FOR AIRCRAFT

(75) Inventor: Junji Oki, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/048,912

(22) PCT Filed: Jun. 5, 2001

(86) PCT No.: PCT/JP01/04726

§ 371 (c)(1),  
(2), (4) Date: Apr. 30, 2002

(87) PCT Pub. No.: WO01/94200

PCT Pub. Date: Dec. 13, 2001

(65) Prior Publication Data

US 2002/0148928 A1 Oct. 17, 2002

(30) Foreign Application Priority Data

Jun. 6, 2000 (JP) .................................. 2000-169574  
Nov. 16, 2000 (JP) .................................. 2000-349833

(51) Int. Cl.[7] .............................. B64C 1/22; B64C 1/20  
(52) U.S. Cl. ................................. 244/118.1; 244/118.5; 244/137.1; 244/137.2  
(58) Field of Search ................. 244/137.1, 137.2, 244/118.1, 118.2, 118.5

(56) References Cited

U.S. PATENT DOCUMENTS

| | | | | | |
|---|---|---|---|---|---|
| 3,517,899 A | * | 6/1970 | Vernon | .................. | 244/118.1 |
| 3,741,504 A | * | 6/1973 | Alberti et al. | ............ | 244/118.1 |
| 3,885,685 A | * | 5/1975 | Montgomery et al. | ... | 244/118.1 |
| 4,022,404 A | * | 5/1977 | Greiss | .................. | 244/118.5 |
| 4,055,317 A | * | 10/1977 | Greiss | .................. | 244/118.5 |
| 4,408,739 A | * | 10/1983 | Buchsel | ................ | 244/137.1 |
| RE32,176 E | * | 6/1986 | Vernon | .................. | 244/118.5 |
| 4,653,707 A | * | 3/1987 | Hamilton et al. | ........ | 244/137.2 |
| 5,314,143 A | * | 5/1994 | Luria | ................... | 244/118.1 |
| 5,413,292 A | * | 5/1995 | Luria | ................... | 244/118.1 |
| 5,496,000 A | * | 3/1996 | Mueller | ............... | 244/118.1 |
| 5,915,905 A | * | 6/1999 | Hopland | | |
| 6,059,229 A | | 5/2000 | Luria | | |
| 6,152,287 A | | 11/2000 | Luria | | |
| 6,305,643 B1 | * | 10/2001 | Sankrithi | ............. | 244/118.1 |
| 6,412,603 B1 | * | 7/2002 | Nervig et al. | ........... | 244/118.1 |
| 6,454,208 B1 | * | 9/2002 | Nervig et al. | ........... | 244/118.1 |
| 6,464,169 B1 | * | 10/2002 | Johnson et al. | .......... | 244/118.5 |
| 6,477,962 B2 | * | 11/2002 | Trujillo | | |
| 6,557,800 B2 | * | 5/2003 | Medina et al. | .......... | 244/118.1 |

FOREIGN PATENT DOCUMENTS

| | | | | |
|---|---|---|---|---|
| EP | 0941923 | | 9/1999 | |
| IL | 96799 | | 9/1991 | |
| WO | WO 95/23733 | * | 9/1995 | ........... 244/118.1 |

* cited by examiner

Primary Examiner—Jack Keith  
Assistant Examiner—L. Semunegus  
(74) Attorney, Agent, or Firm—Wenderoth, Lind & Ponack, L.L.P.

(57) ABSTRACT

The aircraft with multi-level cabins functioning as a cargo cabin or passenger cabin comprises a first cabin provided with a cargo hatchway which is opened and closed by a cargo door on a fuselage, the cargo door facing towards the cargo cabin; a second cabin which lacks the cargo hatchway, the second cabin being positioned directly above or under the first cabin; and an elevator to convey a cargo item, moved into the first cabin through the cargo hatchway, to the second cabin, and to convey back the conveyed cargo item from the second cabin to the first cabin, thereby the cargo item is moved between the exterior of the aircraft and the second cabin.

4 Claims, 24 Drawing Sheets

AIRCRAFT WITH A PLURALITY OF UPPER AND LOWER CABINS FUNCTIONING AS CARGO COMPARTMENTS OR PASSENGER CABINS AND METHOD OF LOADING CARGOS FOR AIRCRAFT

FIELD OF THE INVENTION

This invention relates to an airplane with multi-level cabins for cargos or passengers in its fuselage, into which it is easier to load cargos, and a method of loading cargos into those cabins.

TECHNICAL BACKGROUND

FIG. 25 is a simplified perspective drawing of the cargo cabin into which cargo is loaded in an airplane. FIG. 26 is a lateral cross section (taken perpendicular to the length of the plane) of the cargo cabin. In FIG. 25, 1 is a fuselage of the aircraft; 2 are main wings; and 3 are tail wings.

As can be seen in FIG. 26, this sort of cargo cabin is divided into an upper cargo cabin 10 and a lower cargo cabin 11 by a partition 14 which runs along the length of the fuselage. The upper and lower cargo cabins 10 and 11 have cargo hatchways 023 and 23, respectively, which are opened and closed by cargo doors 012 and 12. Normally, as can be seen in FIG. 25, the cargo cabin has one cargo hatchway 023 in either the fore or aft section of the craft and two cargo batchways 23, one in the fore section and the other in the aft section.

Cargo door 12 and cargo hatchways 23 are normally used to load cargo belonging to passengers and cargo for commercial transportation.

To load cargo item 13 into such a cargo cabin, it is first transported through hatchway 023 into the upper cargo cabin 10. A conveyor (not pictured) which extends along the entire length of the upper cabin floor 28 moves the cargo item to its designated location in upper cargo cabin 10. A cargo item is also transported through hatchway 23 into the lower cargo cabin 11 and transported by a conveyor (not pictured) running along the length of the lower cabin floor 19 to its designated spot in lower cabin 11. When the cargo is to be unloaded, the reverse operation is performed.

As is explained above, the prior art cargo cabin has an upper cargo cabin 10 and a lower cargo cabin 11, each of which has a cargo hatchway (023 and 23) opened and closed by a cargo door (012 and 12). Cargo is loaded and unloaded through these cargo hatchways.

However, the cargo doors (012 and 12) which close the cargo hatchways (023 and 23) must be of the same thickness and made of the same material as fuselage 1 so that they have the same strength as the fuselage having no cut for hatchways. The doors must therefore be extremely massive. Moreover, since there are large pressure and temperature differentials between the inside and the outside of the aircraft, the areas between the doors (012 and 12) and the cargo hatchways (023 and 23) must be rigorously sealed. Thus, installing a cargo door (012 or 12) to close a hatchway (023 or 23) requires numerous assembly processes and costly materials.

The prior art technology shown in FIGS. 25 and 26, then, requires that the sort of cargo hatch doors described above (012 and 12), which entail numerous assembly processes and costly materials, be installed on the cargo hatchways (023 and 23) of the upper cargo cabin 10 and lower cargo cabin 11. This drives up the cost of the aircraft, or, in the case of a passenger aircraft which is being converted into a cargo aircraft, increases the number of processes required and the cost of remodeling the plane.

The present inventors' investigation of the prior art has not turned up any technology concerning the relationship between the cargo doors (012 and 12) and cargo cabins 10 and 11.

FIG. 24 is a partial cross plain section of an aircraft according to the prior art. The galley service spaces 505, 506 are provided at the fore section of fuselage 500, in which the flight attendants prepare the drink service for the passengers seated ahead of main wing 525. Another galley service space 507 is provided at the aft section. Since the drink service is offered after the aircraft takes off, the drink will be consumed before the arrival at the destination. It is necessary, therefore, to exchange the new wagons loaded with drinks during the time that the aircraft is parking at the destination airport. The new sets of wagons provided from gailey service car 503 must be carried into the aircraft via the emergency door provided on the same floor as the passenger cabin floor.

It is, however, not possible to exchange to the new sets of wagons during the time that the passengers are deplaning from the aircraft, and it is possible only after the deplaning of the passengers is completed. This drives the parking period of the aircraft longer, and makes it difficult to schedule many flights in a limited time length. This fact also makes the passenger's waiting time longer, and causes damages for the profitability of the airline companies for the convenience of the passengers.

SUMMARY OF THE INVENTION

In view of the technical problems described, the objective of this invention is to provide a device and method to load cargo into an aircraft of the sort with multi-level cargo or passenger cabins in the fuselage. Such a device would, without diminishing the capacity to load or unload cargo on either level, reduce the number of cargo hatchways and doors through which cargo would be loaded and unloaded and further reduce the cost of the aircraft. If a passenger aircraft is being remodeled into a cargo aircraft, it will obviate the need to provide additional hatchways and doors beyond the hatchways and doors the craft originally came with, and it will greatly reduce the number of processes required and the cost of revamping the craft.

Since the beverage and food service is offered after the aircraft takes off, the beverages will be consumed before the arrival at the destination. It is necessary, therefore, to exchange the new beverage wagons loaded with the drinks during the time that the aircraft is parked at the destination airport.

Another objective of this invention is to provide a device and method to load the new set of beverage and food wagons, as mentioned above, into the aircraft without the necessity of moving the new set of wagons on the same floor as the passenger floor. According to this invention, the loading of the new set of wagons can be processed during the time that the passengers are deplaning from the aircraft. It can shorten the parking time of the aircraft on the ground, and make it possible to schedule more flights in a limited time. This can result in shortening the waiting time for the passengers, and result in improving the profitability of the airline companies and convenience of the passenger.

According to this invention, the aircraft is provided with multi-level cabins functioning as a cargo cabin or passenger cabin. It is distinguished by the configuration which comprises, a first cabin provided with a cargo hatchway which is opened and closed by a cargo door on a fuselage, the cargo door facing towards the cargo cabin; a second cabin which lacks the cargo hatchway, the second cabin being positioned directly above or under the first cabin; and an elevator to convey a cargo item, moved into the first cabin through the cargo hatchway, to the second cabin, and to convey back the conveyed cargo item from the second cabin to the first cabin, thereby the cargo item is moved between the exterior of the aircraft and the second cabin.

It is, therefore, possible in this aircraft according to this invention, to move the cargo items into and from the aircraft through the existing cargo hatchway (hatchway used only for cargos). Since the elevator can move the cargo items between the first cabin provided with a cargo hatchway which is opened and closed by a cargo door on a fuselage, and the second cabin which lacks the cargo hatchway, it obviates the need to provide a new cargo hatchway which lowers the strength of the fuselage. The number of cargo hatchways and doors can be reduced without affecting the ability to load and unload cargo on every level. This arrangement lowers the cost of the aircraft.

When a passenger aircraft is being converted to a cargo aircraft, this arrangement makes it unnecessary to add on any new hatchways and doors beyond what the plane originally had. This significantly reduces both the number of processes required to remodel the plane and the cost of remodeling it.

According to this invention, it is possible to move up the cargo into the cabin for the passengers by the elevator, and move down the cargo from the passenger cabin to the cargo cabin which has the cargo hatchway. This makes it possible to move the cargo without using the passenger floor when they are boarding or deplaning.

The first cabin provided with the cargo hatchway is located in a lower cargo cabin on a lower portion of the aircraft, and the elevator to convey the cargo items between the first cabin and the second cabin located above the first cabin is located near the cargo hatchway.

If the aircraft has three vertical levels of cabins which comprise a lower cargo cabin, a central cargo cabin, and an upper cargo cabin, the lower and central cargo cabins are configured as the first cabin which is provided with the cargo hatchway, the upper cargo cabin is configured as the second cabin which lacks the cargo hatchway, and the elevator conveys the cargo items between the first and second cabins.

More specifically, this invention would provide a cargo hatchway closed by a door only on the lower level cargo cabin. Thus, cargo could be loaded onto the plane through the cargo hatchway and then transported vertically by means of an elevator from the hatchway on the lower level to the upper level cargo cabin. This would obviate the need to provide hatchways with doors on them, as was done in the prior art, on both the upper and lower cargo cabins. The cargo to be stowed in both the lower and upper cargo cabins could be loaded through a single cargo hatchway and unloaded through the same hatchway.

This invention reduces the height above the ground at which cargo is loaded onto the plane. This lowers the cost of the cargo loader and enhances the safety of the personnel who are loading the cargo.

With this invention, then, an aircraft can have a single door or a minimum number of doors to open and close cargo hatchways. These doors must be the same thickness and made of the same material as the fuselage, so they are extremely massive. They must also be rigorously sealed. Reducing the number of doors thus reduces the number of assembly processes required to produce the aircraft and significantly reduces its cost.

When a passenger aircraft is converted to a cargo aircraft, the existing cargo hatchway and door on the lower cargo cabin can be used. An elevator can be provided near the hatchway or elsewhere in the cabin on the lower level, and the cargo loaded through the existing cargo hatchway can be moved vertically by means of the elevator. It can thus be easily transported to the upper cargo cabin, so there is no need to provide an additional hatchway with a door. This reduces both the number of processes required to remodel the plane and the cost.

The aircraft according to this invention has a multi-level cargo cabin. The horizontal conveyor should also be provided in each of the cargo cabins which communicates with the elevator so as to receive or load cargo. Such a conveyor would receive the cargo moved by the elevator and convey it horizontally into the cabin on that level.

If the cargo cabins are large, cargo hatchways can be provided in several locations on the cargo cabin wall, and an elevator can be provided near each of the hatchways. If this configuration is chosen, cargo can be loaded and unloaded through a number of hatchways along the length of the fuselage. This will improve the efficiency of the loading operation.

The elevator can comprise a cargo stage for loading the cargo item; an expansion link connected to the bottom of the cargo stage which can expand vertically; and an actuator to expand or contract the expansion link so as to move the cargo stage up or down. Alternatively, the elevator can comprise a cargo stage for loading the cargo item; a plurality of ropes connected to the cargo stage and a plurality of pulleys from which the rope is hung, which raise and lower the cargo stage; and a drive mechanism connected to the ropes, which raises and lowers the cargo stage by winding up or letting out the ropes.

If the latter configuration is chosen, a rope is connected to the stage on which the cargo is loaded, and the rope is connected via a pulley to a drive mechanism. The drive mechanism takes up or lets out the rope to raise or lower the loading stage. This configuration allows the stage to be raised easily to a considerable height, so it would obviate the need for a cargo hatchway on each level even if an air cargo plane had three or more levels. It would minimize the number of hatchways and doors, and would further reduce the number of assembly processes required to build the plane as well as its cost.

The invention could also be effectively realized by the following configuration. The cargo cabin is divided by a plurality of horizontal partitions, and the elevator comprises a driving device to drive the elevator and a gear to be driven by the driving device; and a guide rail, and racks provided on the guide rail and interlocked with the gears, which are stored in the partition and come out in a vertical direction before the elevator is activated.

With the technology described above, a drive source and gears connected to the drive source are provided on the elevator. The cargo cabin is divided by partitions. In the walls of the partitions is a guide mechanism which guides the movement of the elevator and racks interlocked with the gears. Before the elevator is driven, the mechanism which guides the elevator and the hardware related to moving the gears and the interlocked racks move into the area traveled by the elevator. When the elevator is not being driven, the hardware related to its movement is stored in the partition walls rather than remaining in the cargo cabin. This enhances the safety of any personnel working in the area.

The invention could also be effectively realized by the following configuration. The galley service space is provided in the second cabin used as a passenger cabin, and the elevator conveys a wagon container filled with wagon cargos between the galley service space and the first cabin, so that the wagon cargos are moved in and out from the wagon container in the galley service space, and the wagon container is conveyed between the exterior of the aircraft and the galley service space.

With the technology described above, the configuration makes it possible to move the wagons through the cargo hatchway provided in the cargo cabin. It can move the wagons to the galley service space in the second cabin by the elevator. It is no longer necessary to move the wagons on the passenger floor as in the prior art. It is, thus, possible to deliver the wagons during the time that the passengers are getting off the aircraft. It is, therefore, no longer necessary to exchange the new and old wagons after the passengers leave the aircraft as a conventional way, and it can be processed during the time passengers are getting off the aircraft. This can shorten the parking time of the aircraft, and more flights can be scheduled in the same length of time. This can shorten the waiting time of the passengers, and also improve the profitability of the airlines and convenience of the passengers.

DETAILED DESCRIPTION OF THE PREFERRED EMBODIMENTS

In this section we shall explain several preferred embodiments of this invention with reference to the appended drawings. Whenever the size, materials, shapes, relative positions and other aspects of the parts described in the embodiments are not clearly defined, the scope of the invention is not limited only to the parts shown, which are meant merely for the purpose of illustration.

Figure 1:
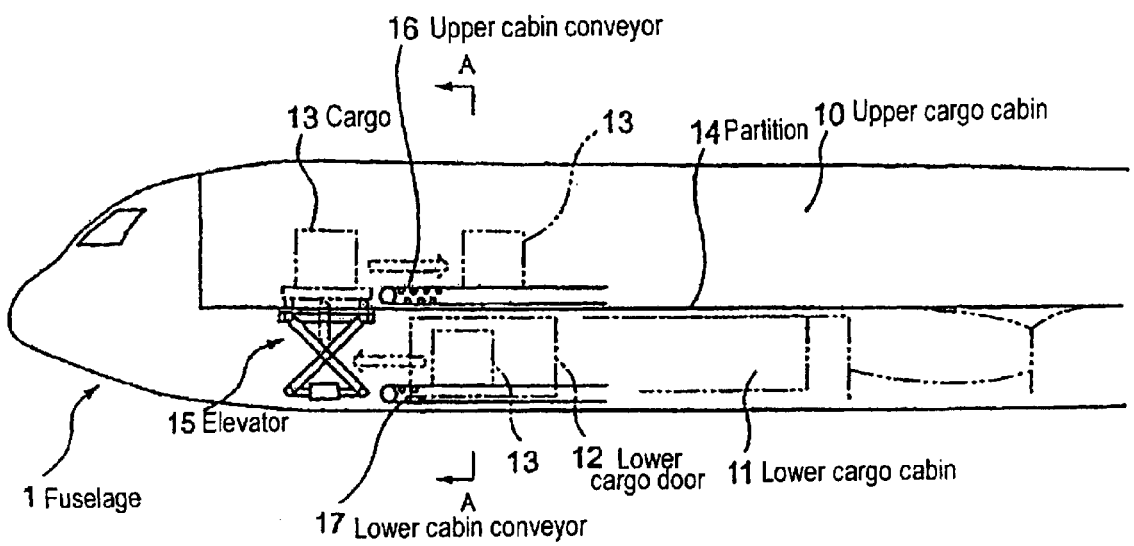
FIG. 1 is a lateral view of the main components of a cargo loading device to load cargos into a cargo plane which is the first preferred embodiment of this invention.
Figure 2:
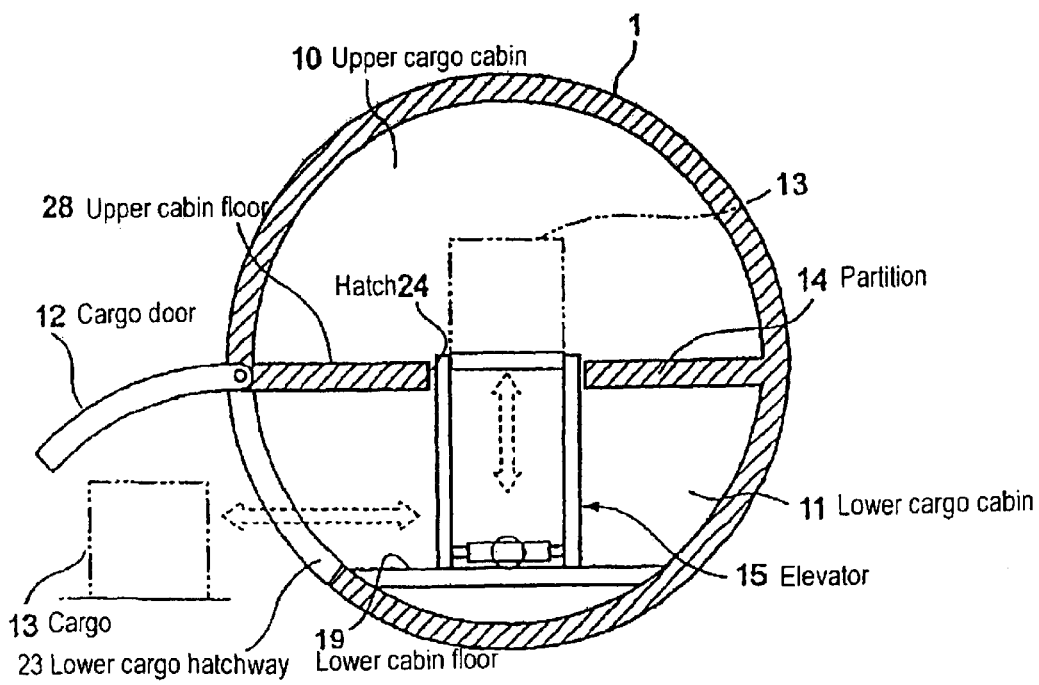
FIG. 2 is a cross section taken along line A—A in FIG. 1.
Figure 3:
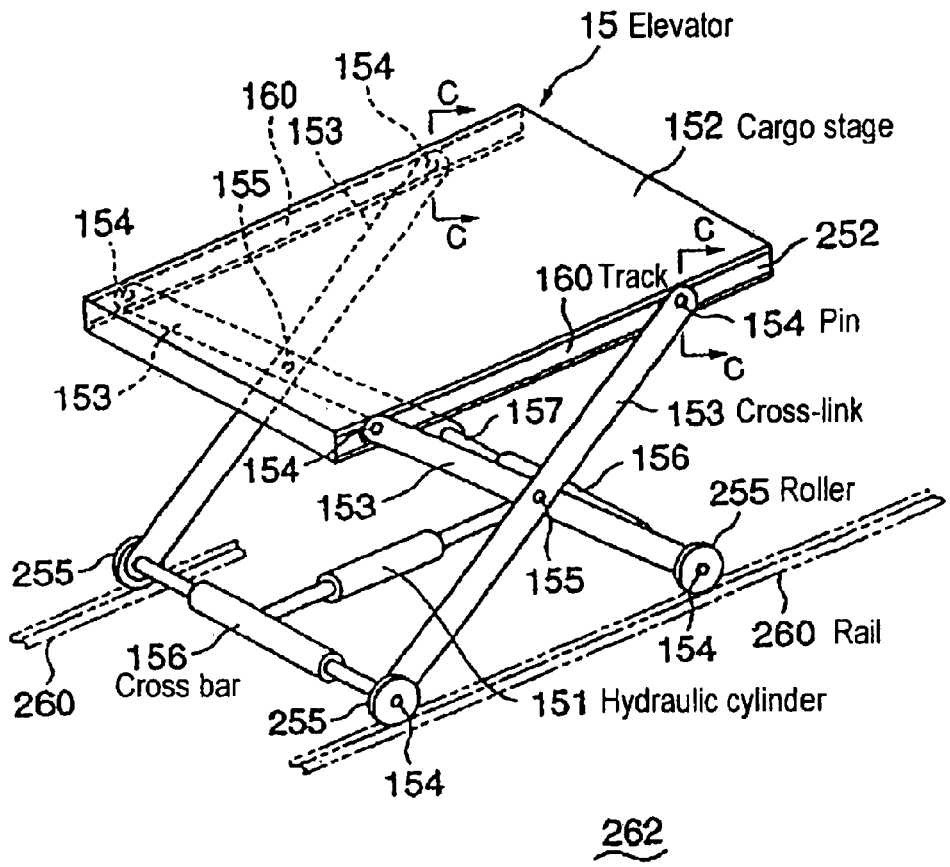
FIG. 3(a) is a perspective drawing of the elevator.
FIG. 3(b) is a cross section taken along line C—C shown in FIG. 3(a).
Figure 3:
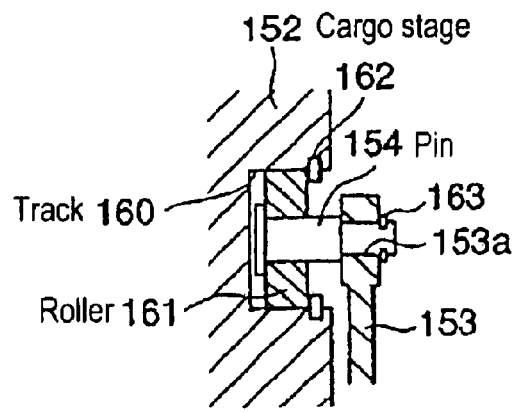
Figure 4:
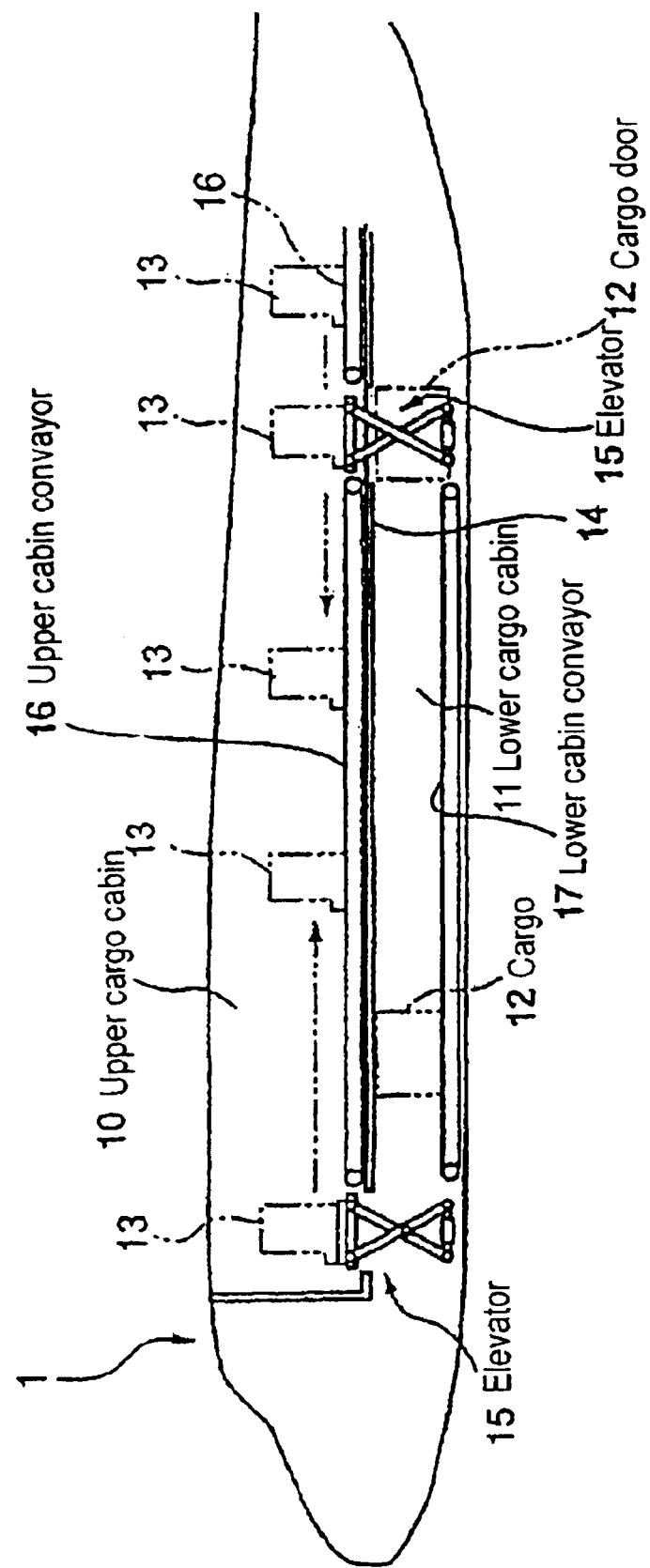
FIG. 4 shows the second embodiment which corresponds to the cargo loading device shown in FIG. 1.
Figure 5:
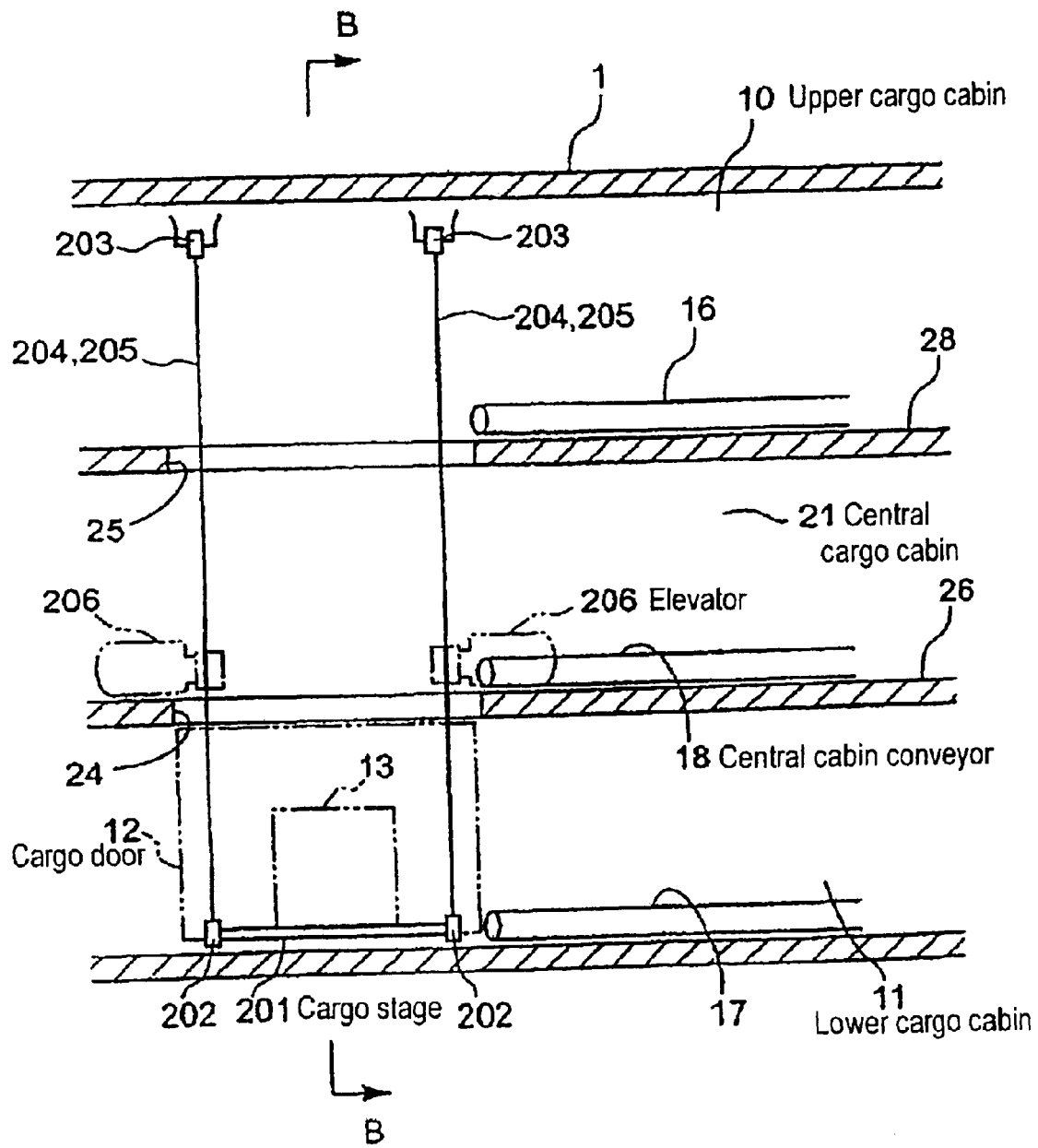
FIG. 5 is a cross section showing the main components along the longitudinal axis of the plane of the third preferred embodiment.
Figure 6:
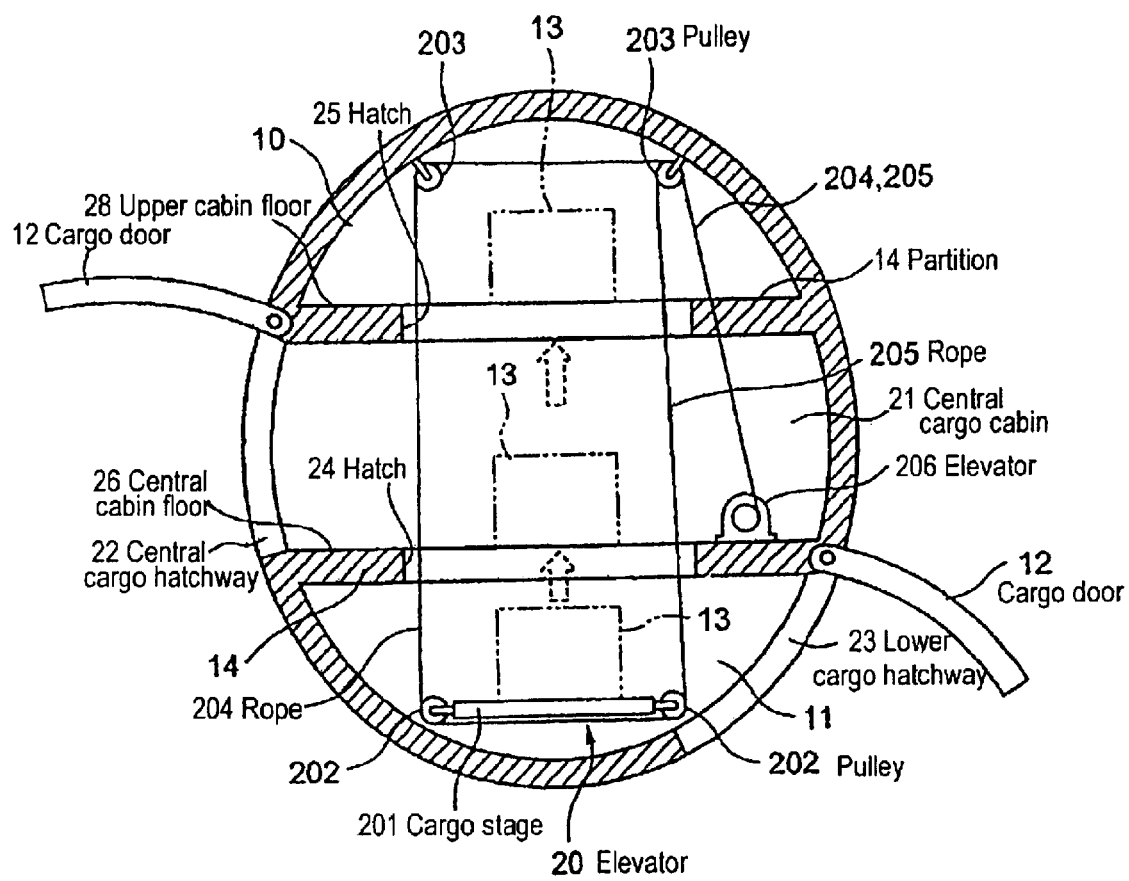
FIG. 6 is a cross section taken along line B—B shown in FIG. 5.

FIG. 1 is a lateral view of the main components of a cargo loading device to load cargos into a cargo plane which is the first preferred embodiment of this invention. FIG. 2 is a cross section taken along line A—A in FIG. 1. FIG. 3 is a perspective drawing of the elevator. FIG. 4 shows the second embodiment in an illustration which corresponds to that shown in FIG. 1. FIG. 5 is a cross section showing the main components along the longitudinal axis of the plane of the third preferred embodiment. FIG. 6 is a cross section taken along line B—B shown in FIG. 5.

In FIGS. 1 and 2, which show the first embodiment of this invention, 1 is a fuselage. The interior of the fuselage 1 is divided into an upper cargo cabin 10 and a lower cargo cabin 11 by a partition 14 which runs along the length of the plane. 23 is a lower cargo hatchway into the lower cargo cabin 11. 12 is a cargo door which closes the lower cargo hatchway 23. As can be seen in FIG. 1, only one lower cargo hatchway 23 and cargo door 12 are provided on the forward section of the plane.

24 is a hatch provided in one location (or, as will be discussed shortly, in two or more locations) in the partition 14. This hatch allows the lower cargo cabin 11 and upper cargo cabin 10 to communicate in one, or as will be discussed shortly, two or more locations. Below the hatch 24 is an elevator 15. The elevator 15 transports cargo item 13, which has been loaded into the lower cargo cabin 11, vertically up to upper cargo cabin 10. We shall explain this elevator in detail shortly.

17 is a lower cabin conveyor which runs along the length of the fuselage on lower cabin floor 19 of the lower cargo cabin 11. It is adjacent to the lower cargo hatchway 23 on the lower level. The front end of the conveyor is adjacent to the elevator 15 so that the cargo 13 conveyed from lower cargo hatchway 23 can be deposited on elevator 15.

16 is a upper cabin conveyor which runs along the length of the fuselage on upper cabin floor 28 of the upper cargo cabin 10. The front end of the upper cabin conveyor is adjacent to hatch 24, the opening for the elevator 15. The upper cabin conveyor 16 receives cargo 13 conveyed by elevator 15 and transports it into the interior of upper cargo cabin 10.

In FIGS. 3(a) and (b), which show the first example of the elevator 15, 152 is a cargo stage on which cargo is loaded. 153 and 153 are two pairs of cross-links. Each pair of cross-links has a pin 155 fastening the centers of the two links in such a way that they are free to rotate and slide.

The upper ends of the cross-links 153 are fixed to the lateral surfaces 252 of the cargo stage 152 by pins 154 in such a way that they are free to rotate.

The lower ends of the cross-links 153 are attached to rollers 255 by pins 154 in such a way that they are free to rotate. Rollers 255 run on rails 260, which are oriented either lengthwise or crosswise on floor 262 of the lower cargo cabin 11. They allow the elevator 15 to move lengthwise in lower cargo cabin 11.

As can be seen in FIG. 3(b), pins 154 are inserted through holes 153a on the tops of the cross-links 153 in such a way that they can move and slide. Rollers 161 engage with the bases of the pins 154 in such a way that they are free to rotate. The rollers 161 roll in tracks 160, which run parallel to the rails 260 on either side of the cargo stage 152. When hydraulic cylinder 151, which will be discussed shortly, expands and contracts, the cargo stage 152 moves up and down, and the rollers 161 run along track 160. 162 and 163 are snap rings to prevent the rollers from leaving the tracks.

156 are cross bars. They are connected to the lower ends of the cross-links 153 by pins 157 in such a way that they are free to rotate and move. They connect the bottoms of the cross-links 153. 151 is a hydraulic cylinder. It connects the cross bars 156 in such a way that it can expand or contract. On the bottom of the case of the hydraulic cylinder 151 is a fixing means of fixing the cylinder to the floor when elevator 15 is in use. This fixing means may be a magnet, a suction cup or a bolt. A pneumatic cylinder or an electric actuator may be used instead of the hydraulic cylinder 151.

In the first embodiment, when cargo item 13 is loaded into the plane, the cargo item 13 is transported, as shown by the arrows in FIG. 2, from lower cargo hatchway 23 onto lower cabin conveyor 17 in the lower cargo cabin. The lower cabin conveyor 17 is driven, and the cargo item moves horizontally as indicated by the arrow in FIG. 1 until it reaches the location of the elevator 15.

To lower the elevator 15 at this time, hydraulic cylinder 151 is expanded, and the cross-links 153 fold in, thus moving the cargo stage 152 downward. The upper surface of the cargo stage 152 is thus positioned at the same height as the lower cabin conveyor 17. This allows the cargo item 13 on the lower cabin conveyor 17 to be loaded easily onto the cargo stage 152.

When the hydraulic cylinder 151 contracts, the cross-links 153 extend upward, the cargo stage 152 is raised, and the upper surface of the cargo stage 152 stops at the same height as the upper cabin conveyor 16 in the upper cargo cabin. The cargo item 13 on the cargo stage 152 can thus be easily loaded, as indicated by the arrow in FIG. 1, onto the upper cabin conveyor 16 in the upper cargo cabin.

The elevator 15 can move along the length of lower cargo cabin 11 along the rails 260.

When the cargo item 13 which is conveyed from the cargo hatchway 23 onto the edge of lower cabin conveyor 17 in the lower cargo cabin is to be moved into the lower cargo cabin, the lower cabin conveyor 17 on which it is sitting is driven to move cargo item 13 horizontally to its designated position.

With this embodiment, a cargo hatchway (lower cargo hatchway 23) is provided only in lower cargo cabin 11 on the lower portion of fuselage 1. Cargo item 13 is transported from the cargo hatchway 23 into the plane and then up to the upper cargo cabin (upper cargo cabin 10) by the vertical movement of elevator 15. This arrangement obviates the need for a cargo hatch with a cargo door in both lower and upper cargo cabins 11 and 10, as was the case in the prior art. Cargo items 13 to be transported in both lower cargo cabin 11 and upper cargo cabin 10 can be loaded and unloaded via a single cargo hatchway 23 and cargo door 12.

With this embodiment, then, the aircraft needs only a single or a minimum number of cargo doors 12 to close cargo hatchways 23. Since these doors must be of an identical thickness with fuselage 1 and constructed of the same materials, they are extremely massive; and they must be rigorously sealed. Reducing the number of doors thus significantly reduces both the number of assembly processes required to construct the aircraft and the cost of the required materials.

When a passenger aircraft is converted to a cargo aircraft, the existing cargo hatchway and door into lower cargo cabin 11 can be used. The elevator 15 can be installed near the hatchway, and the cargo item loaded through the existing cargo hatchway can be moved vertically by means of the elevator 15. It can thus be easily transported to upper cargo cabin 10, so there is no need to provide an additional hatchway with a door. This reduces both the number of processes required to remodel the plane and the cost.

We shall next discuss the second preferred embodiment of this invention, which is pictured in FIG. 4. This embodiment differs from the first in that instead of having a single elevator 15 in the forward section of the aircraft, it has elevators 15 in both the forward and aft sections of the aircraft. As can be seen in FIG. 4, there are cargo hatchways 23 and cargo doors 12 in two locations, forward and aft, on lower cargo cabin 11. There is an elevator 15 adjacent to each of the cargo hatchways 23 and cargo doors 12. Between the two aforesaid elevators 15 in both lower cargo cabin 11 and upper cargo cabin 10 are conveyors 16 in the upper cabin and 17 in the lower cabin.

If this configuration is chosen, cargo items 13 can be loaded and unloaded through two hatchways 23 in the fore and aft sections of the plane. This will improve the efficiency of the loading operation. All other aspects of the configuration are identical to those of the first embodiment.

We shall next discuss the third preferred embodiment of this invention, with reference to FIGS. 5 and 6. This embodiment differs from the first and second embodiments in regard to the elevator. Rather than being driven by cross-links and a hydraulic mechanism, as in the first and second embodiments, the elevator in the third embodiment is driven by a motor and a rope.

In FIGS. 5 and 6, a central cargo cabin 21 is created by horizontal partitions 14, 14 between lower cabin 11 and upper cabin 10. 20 is a elevator which travels between lower, central, upper cargo cabins 11, 21 and 10. It is constructed as follows.

In FIGS. 5 and 6, 201 is the cargo stage on which cargo item 13 is loaded. In four locations on its edges (or five or more, if desired) are pulleys 202, which are mounted in such a way that they can rotate. On pulleys 202 are hung ropes 204 and 205 (or more ropes, as long as the number is even), which move up and down through hatches 24 and 25 cut into horizontal partitions 14.

203 are pulleys which are mounted in four places on the ceiling of the upper cargo cabin 10 in such a way that they are free to rotate. These pulleys are mounted opposite pulleys 202 on the cargo stage 201. The ropes 204 and 205 are hung from the pulleys 202. 206 are the two elevators provided in the fore and aft sections of the fuselage. The ends of ropes 204 and 205, which are hung on the pulleys 203, are coiled up by means of an electric motor or the like. When the ropes 204 and 205 are wound up or let out, the cargo stage 201 is raised or lowered in the plane.

In this embodiment, in addition to lower cargo hatchway 23 and lower cargo door 12 on the lower cargo cabin 11, there is a central cargo hatchway 22 and a central cargo door on the center level, in the central cargo cabin 21. However, the central cargo hatchway 22 and central cargo door could be eliminated.

In this embodiment, when ropes 204 and 205 are let out from the elevator mechanisms 206, 206, the cargo stage 201 drops to its lowest position. The cargo item 13 which is loaded into lower cargo cabin 11 through lower cargo hatchway 23 is placed on the stage 201

When ropes 204 and 205 are wound up by the elevator mechanisms 206, 206, cargo stage 201, with cargo item 13 on it, is raised as shown by the arrows in FIG. 6. When the cargo stage 201 reaches the central cabin floor 26 of central cargo cabin 21, cargo item 13 is moved onto central cabin conveyor 18 on central cabin floor 26 and transported to its designated location. When the cargo stage 201 reaches the upper cabin floor 28 of upper cargo cabin 11, cargo item 13 is moved onto upper conveyor 16 on upper cabin floor 28 and transported to its designated location.

A cargo item 13 loaded into central cargo cabin 21 via the central cargo hatchway 22 can be placed on the cargo stage 201 and transported in just the same manner.

With this embodiment, ropes 204 and 205 are connected to the cargo stage 201 on which is placed cargo item 13. The ropes 204 and 205 are connected via pulleys 202 and 203 to elevator mechanisms 206, which, by winding them up or letting them out, causes the cargo stage 201 to be raised or lowered. This configuration allows the cargo stage to attain a considerable vertical height with ease, so that it can service not just three levels of cargo cabins, as in this embodiment, but four or more, thus obviating the need for a cargo hatchway on each level. This minimizes the number of cargo hatchways and doors required, which in turn further reduces both the number of assembly processes needed to construct the aircraft and the cost of materials.

In any of the embodiments, the cargo is unloaded from the plane using the reverse operation from that described above.

With an embodiment like that described above, a cargo item is loaded into the upper cargo cabin from the lower cargo hatchway on the lower level by means of an elevator. Thus, there is no need for cargo hatchways closed by doors on both the upper and lower cargo cabins, as was the case in the prior art. Cargo to be carried in both the lower and upper cabins can be loaded and unloaded through a single cargo hatchway.

With this invention, then, an aircraft can have a single door or a minimum number of doors to open and close cargo hatchways. These doors must be the same thickness and made of the same material as the fuselage, so they are extremely massive. They must also be rigorously sealed. Reducing the number of doors thus reduces the number of assembly processes required to produce the aircraft and significantly reduces its cost.

When a passenger aircraft is converted to a cargo aircraft, the existing cargo hatchway and door into the lower cargo cabin can be used. The elevator can be provided near the hatchway, and the cargo loaded through the existing cargo hatchway can be moved vertically by means of the elevator. It can thus be easily transported to the upper cargo cabin, so there is no need to provide an additional hatchway with a door. This reduces both the number of processes required to remodel the plane and the cost.

With this embodiment, then, the number of cargo hatchways and doors can be reduced without adversely affecting the ability to load and unload cargo into and out of any of the cargo cabins. This reduces the cost of the plane, or, if a passenger plane is being converted to a cargo plane, it reduces the number of processes required and the cost.

If several cargo hatchways are provided along the length of the aircraft, cargo can then be loaded and unloaded through all of them, resulting in a more efficient cargo loading operation.

If ropes are connected to the cargo stage on which the cargo is placed and the ropes are connected through pulleys to a drive mechanism, the drive mechanism can wind or let out the rope to cause the cargo stage to be raised or lowered. This configuration allows the stage to attain a considerable vertical height with ease, so that a cargo hatchway need not be provided on each level, even if a plane has three or more cargo cabins. This configuration minimizes the number of cargo hatchways and doors required, which in turn further reduces both the number of assembly processes needed to construct the aircraft and the cost of materials. Furthermore, the highest level of cargo cabins in a cargo airplane with three levels will generally be about 10 meters off the ground. If the cargo is loaded into the middle level cargo cabin from the exterior and then transferred to the upper level by elevator, the safety of the workers doing the loading will be enhanced.

Figure 7:
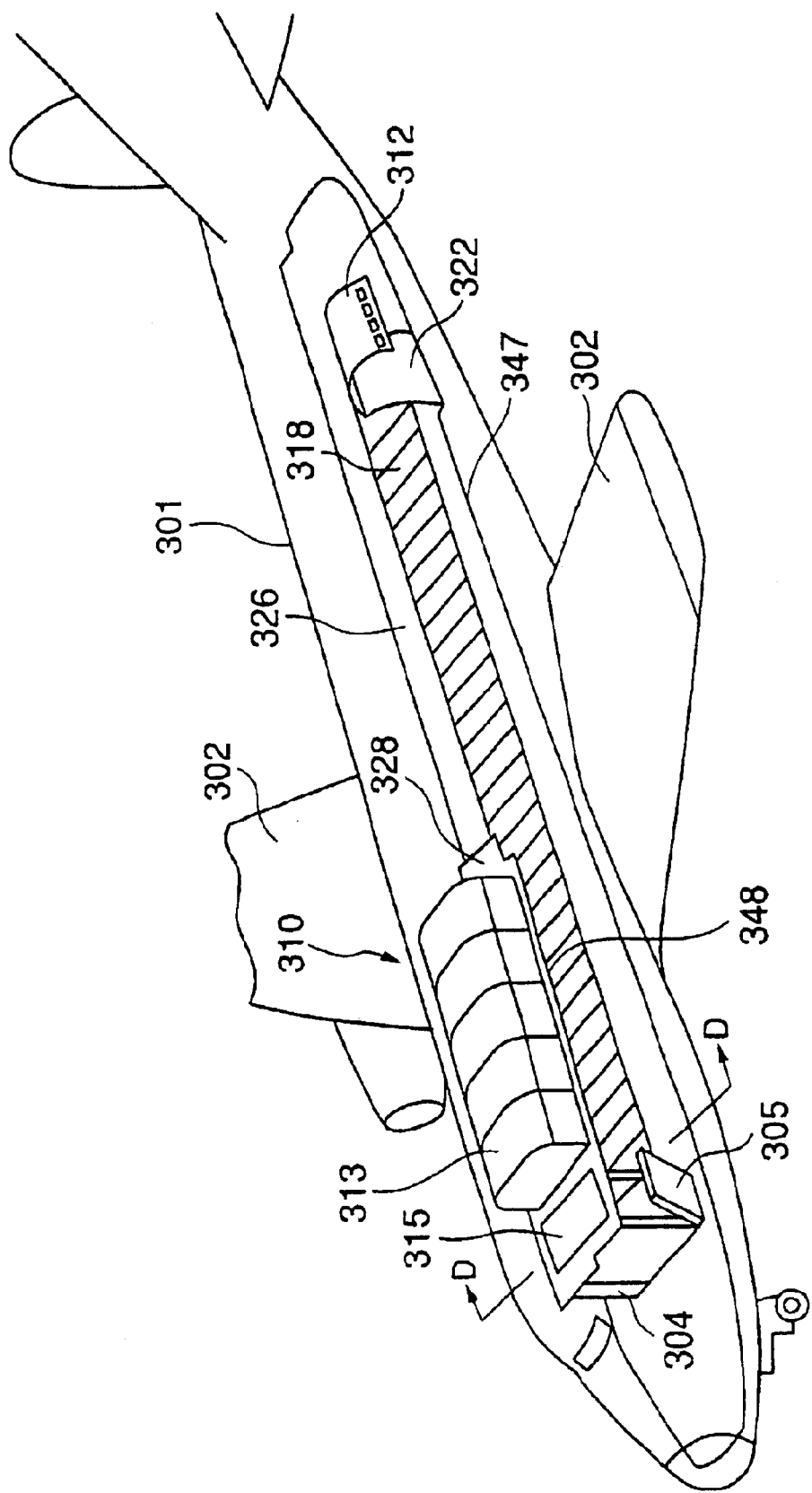
FIG. 7 is a rough perspective drawing of an aircraft to transport air cargo, which is related to the fourth preferred embodiment.

We shall next discuss the fourth preferred embodiment. FIG. 7 is a rough perspective drawing of an aircraft to transport air cargo, which is related to the fourth preferred embodiment. This embodiment differs from the first through third embodiments as follows. The first and second embodiments have an elevator which comprises a cargo stage, cross-links and a hydraulic mechanism. The third embodiment's elevator uses a motor and ropes. The fourth embodiment's elevator has a guide rail, racks, and gears which engage with the racks.

In FIG. 7, there is a central cargo hatchway 322 in the aft section of fuselage 301. A cargo door 312 which can open and close is placed on the central cargo hatchway 322. There is a lower horizontal partition 347 inside the plane. A lower cargo conveyor 318 on the partition conveys containers 313, which have been loaded via central cargo hatchway 322, to the fore section of the plane. Above lower horizontal partition 347 in the forward part of the plane is an upper horizontal partition 348, which creates cargo cabin 310. At the forward end of the upper horizontal partition 348 are elevator 315 and a conveyor, which is not pictured. The containers 313 which have been transported on the conveyor are placed on upper cabin floor 328 of upper horizontal partition 348.

Figure 8A:
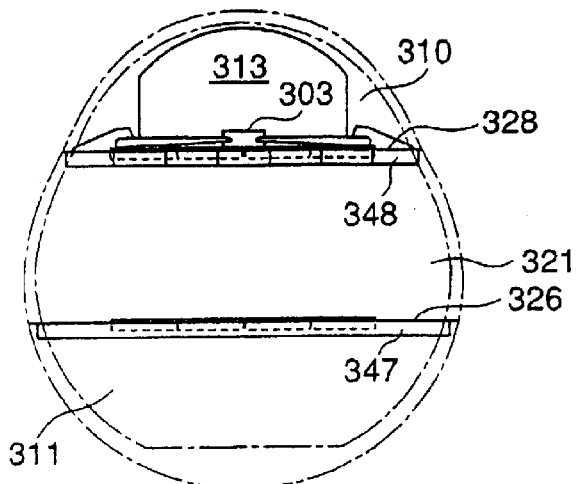
FIG. 8 is a cross section taken along line D—D shown in FIG. 7.
Figure 8B:
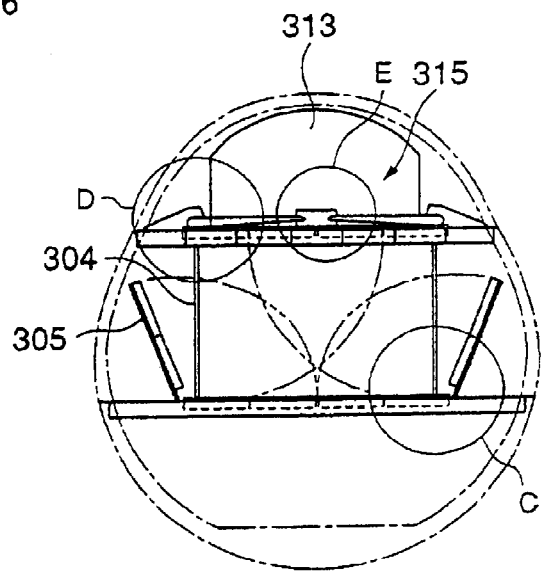

FIG. 8(a) shows how the elevator 315 looks when containers 313 are stowed in upper cargo cabin 310 and the plane is in flight. FIG. 8(b) shows how the elevator is positioned when containers 313 are to be loaded into cargo cabin 310 or unloaded from it. On the floor of elevator 315, there is a drive source 303 with a motor, as will be explained in detail shortly, to enable it to move vertically.

Figure 8C:
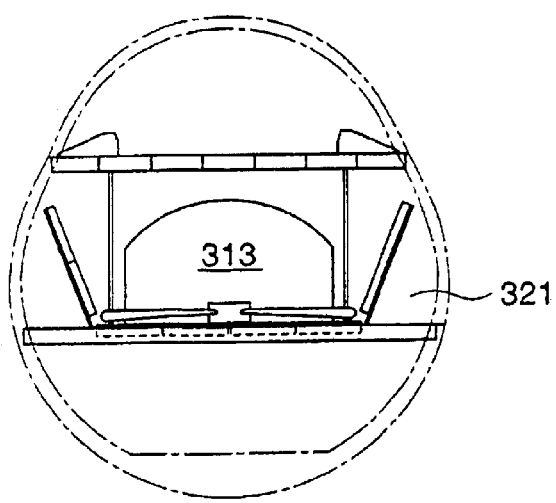

When containers 313 are to be transported from upper cargo cabin 310 to central cargo cabin 321, as is shown in FIG. 8(b), retractable floor 305 opens up. Guide rails 304, which are stored in upper horizontal partition 348, come out, and their forward ends lock into lower horizontal partition 347 in a manner which will be explained shortly. Racks which are attached to guide rail 304 and gears which are not pictured engage, and elevator 315 descends. FIG. 8(c) shows the elevator once it has landed on the level of central cargo cabin 321.

Figure 9:
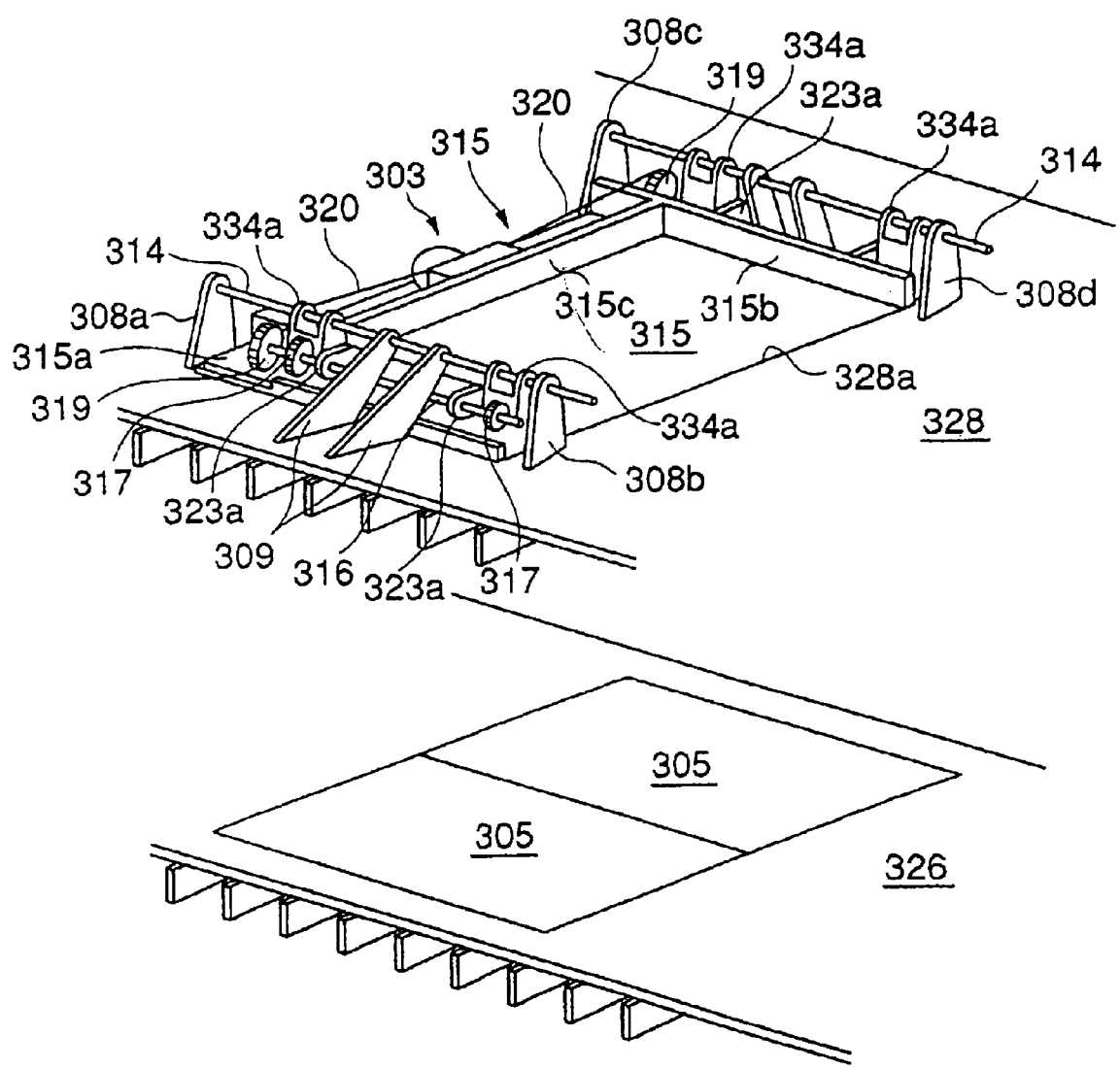
FIG. 9 is a first perspective drawing of an elevator related to the fourth preferred embodiment.

FIG. 9 is a perspective drawing of an elevator related to the fourth preferred embodiment. In this figure, there is a square opening 328a in the upper cabin floor 328 of upper horizontal partition 348. Elevator 315 goes through the opening 328a.

The mechanism which raises and lowers elevator 315 is located around the edges of opening 328a. One support rod 314 is held in such a way that it can rotate by support members 308a, 309, 309 and 308b. The other support rod 314 is held in such a way that it can rotate by support members 308c, 309, 309 and 308d. In the centers of rods 309 are actuators 338 (See FIG. 18), which will be discussed shortly. The support rods 314 face each other on opposite sides of opening 328a.

Four rack heads 334a are hung on the support rods 314 in locations which correspond to the corners of opening 328a. The support rods 314 engage in the openings of rack heads 334a in such a way that they are free to rotate.

Elevator 315 is placed in the opening 328a. On three edges of its floor 315a are two walls 315b and one wall 315c. Gear supports 323, 323 are behind walls 315b. Gear shafts 316 (See FIG. 17) engage in the ends 323a of the gear supports 323 in such a way that they are free to rotate. Sprockets 319 are fixed to one end of the gear shafts 316. Elevator gears 317 are fixed to the shafts parallel to the sprockets 319. Motor 306 and reduction gear unit 307 (see FIG. 21) are behind wall 315c, as will be discussed shortly. The drive force of motor 306 is transmitted from the output gear (not pictured) of gear unit 307 by means of chain 320, which is tensioned on sprockets 319, to the sprockets, and then to elevator gears 317. When elevator gears 317 rotate, they engage with racks which is not shown in the drawing, causing the elevator to descend.

Figure 10:
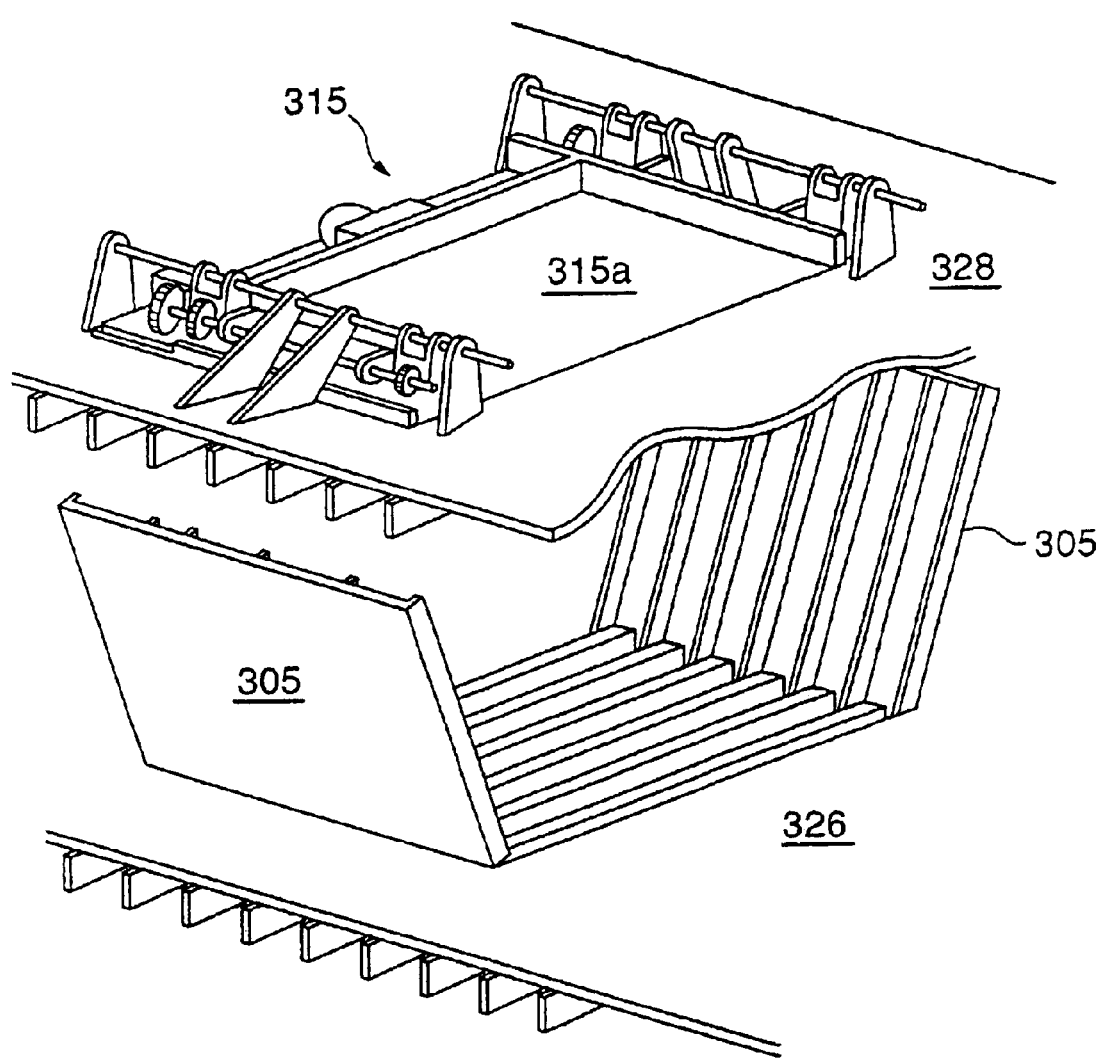
FIG. 10 is a second perspective drawing of an elevator related to the fourth preferred embodiment.
Figure 11:
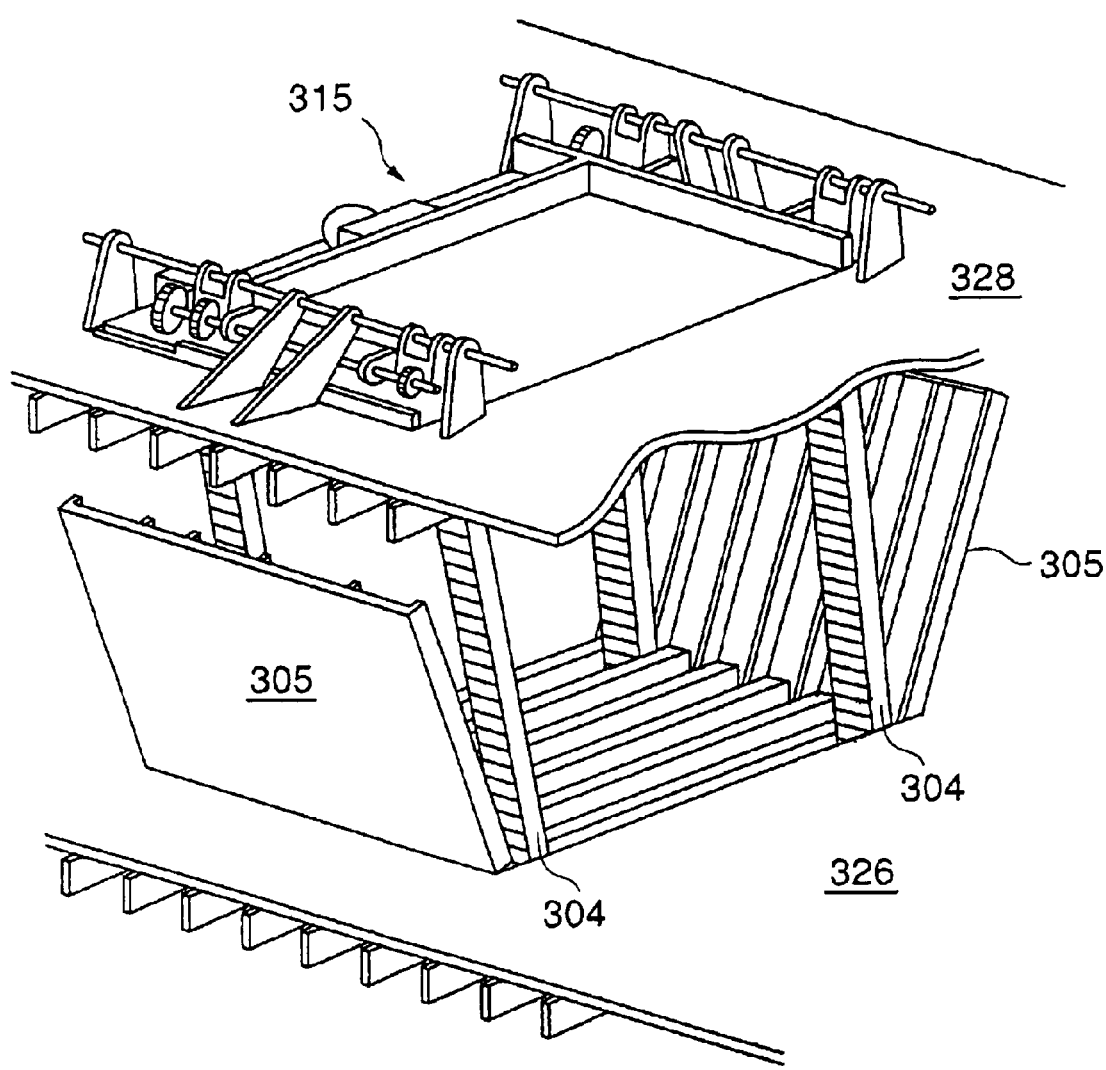
FIG. 11 is a third perspective drawing of an elevator related to the fourth preferred embodiment.

FIG. 10 shows the appearance of retractable floor 305 on central cabin floor 326 of central cargo cabin 321 (See FIG. 8) when it is opened so that elevator 315 can descend. FIG. 11 shows the appearance of the central cargo cabin after retractable floor 305 has been opened and the upper ends of guide rails 304, which are stored below elevator 315, have rotated downward so that they can lock into lower horizontal partition 347, which forms the central cabin floor 326 of central cargo cabin 321 (See FIG. 8). Once the guide rails are in place, elevator 315 can descend to central cabin floor 326 of central cargo cabin 321 (See FIG. 8).

Figure 12:
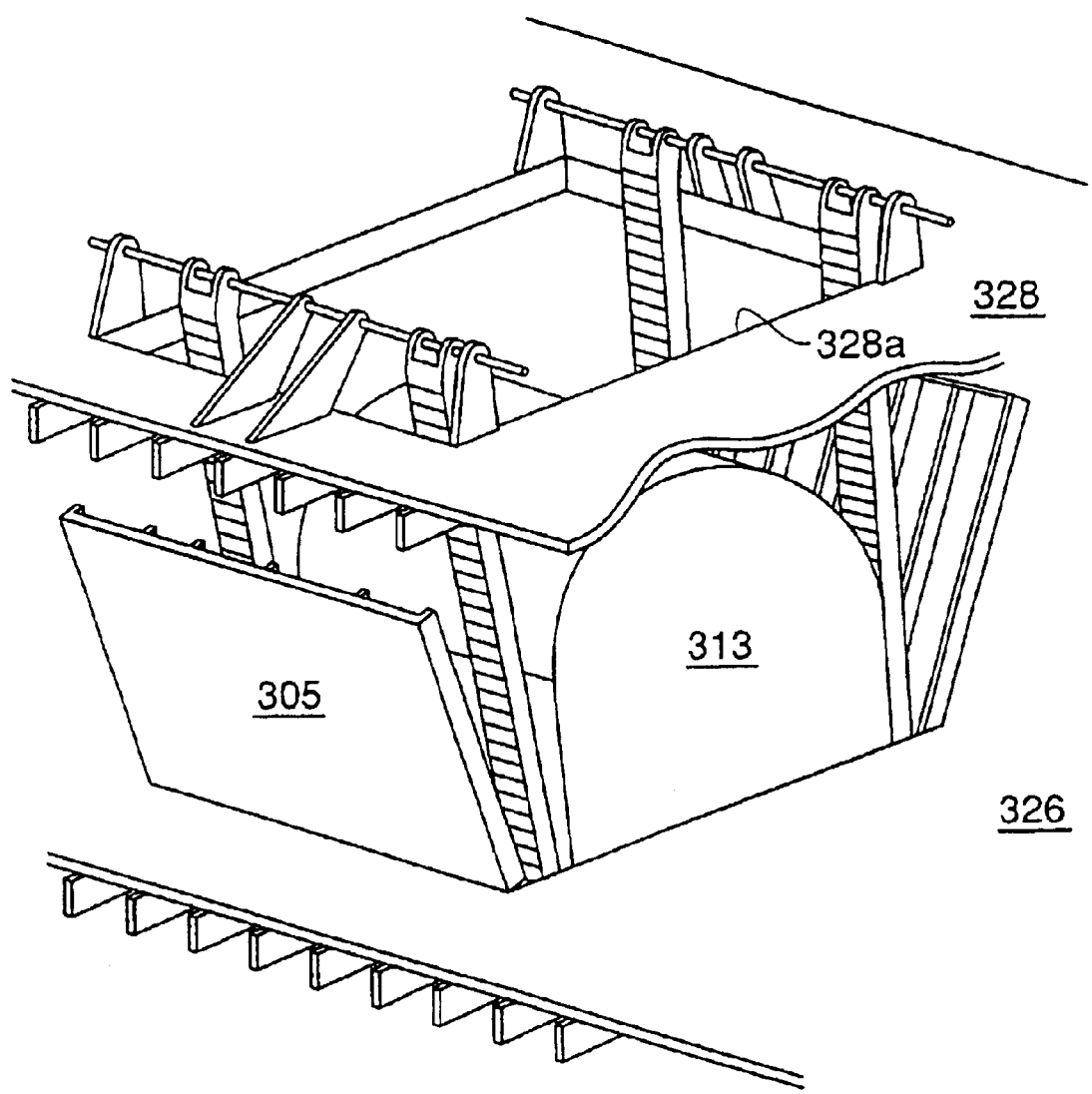
FIG. 12 is a fourth perspective drawing of an elevator related to the fourth preferred embodiment.
Figure 13:
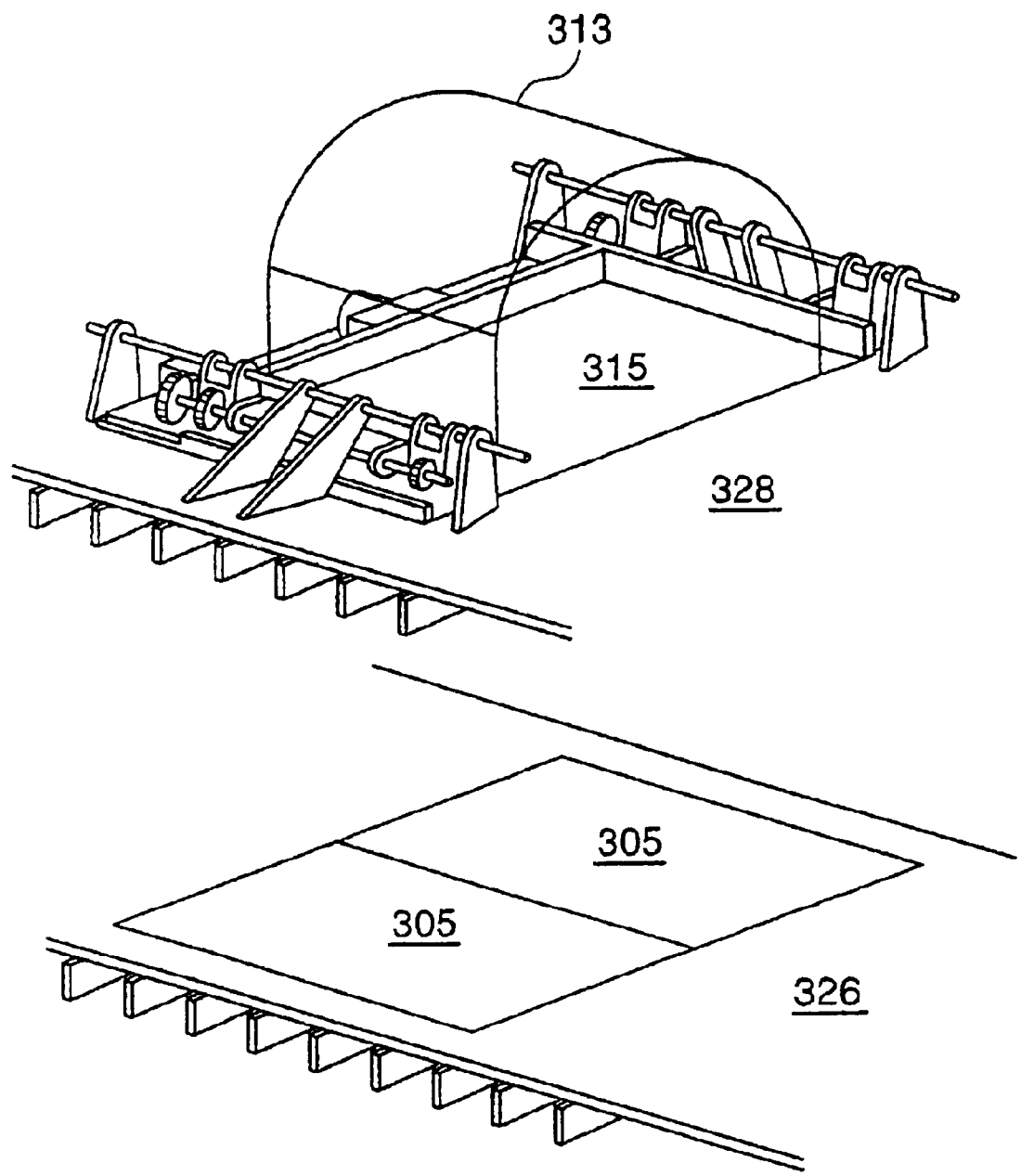
FIG. 13 is a fifth perspective drawing of an elevator related to the fourth preferred embodiment.

FIG. 12 shows the appearance of the elevator when containers 313 are placed on central cabin floor 326 of central cargo cabin 321 (See FIG. 8). In this state, as is shown in FIG. 13, containers 313 are carried to upper cargo cabin 310 (See FIG. 8).

Figure 14:
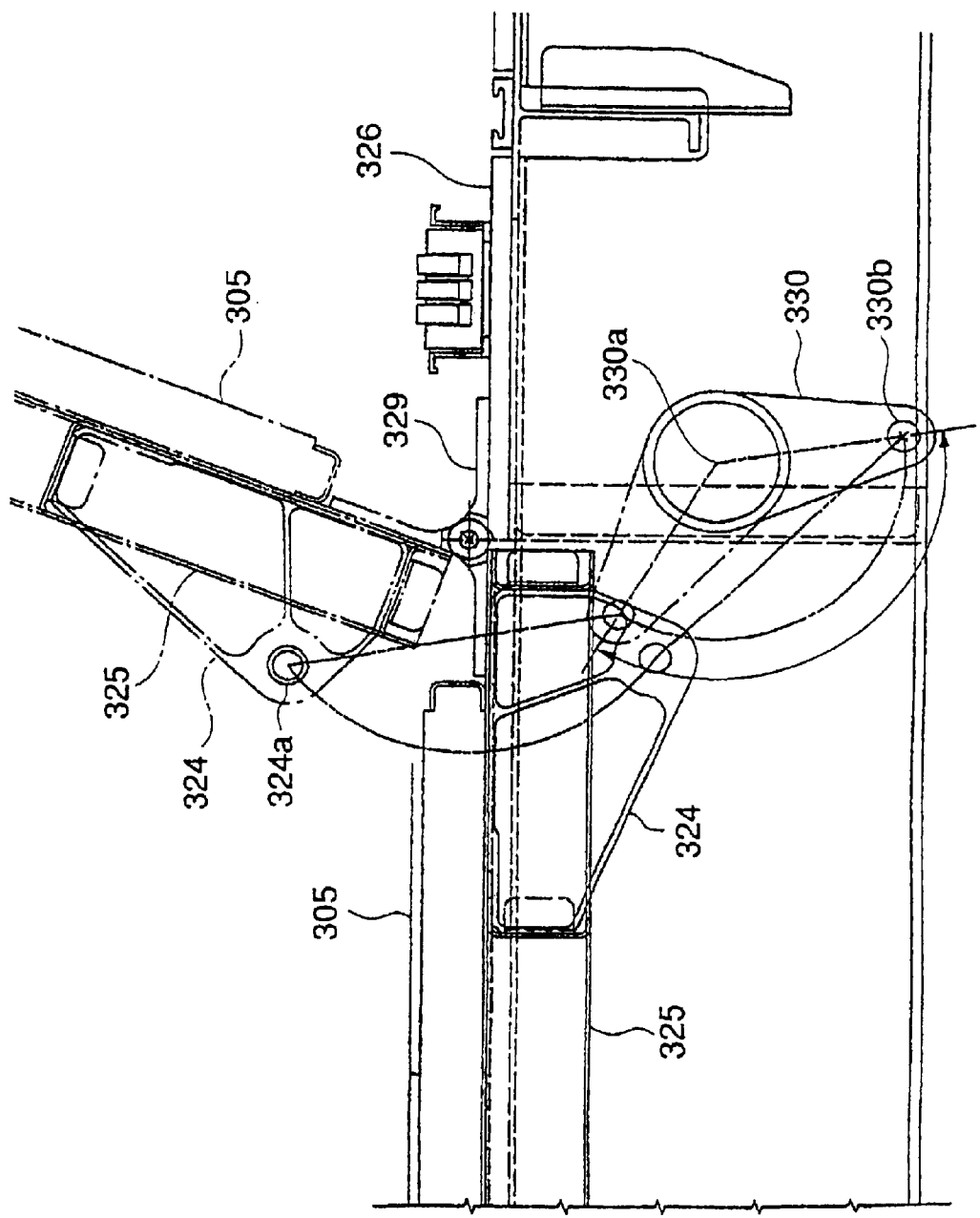
FIG. 14 is an illustration to explain the mechanism to open and close the retractable floor according to the fourth preferred embodiment.

We shall next explain the details of each mechanical component. FIG. 14 is a close-up view of portion C in FIG. 8(b). It shows the base of retractable floor 305, which is placed on central cabin floor 326 of central cargo cabin 321 (See FIG. 8) in such a way that it can open and close. In FIG. 14, hinges 329 are attached to central cabin floor 326. One end of stage 325, to which retractable floor 305 is mounted, is fixed to the movable portions of the hinges 329. Connecting unit 324 is attached to the stage 325. Lever 330 is mounted below central cabin floor 326 in such a way that it is free to rotate around shaft 330a. A connector panel, which is not pictured, is placed between opening 330b on the end of the lever 330 and opening 324a in the connector unit 324. A motor, which is not shown, is connected to shaft 330a of lever 330.

Because the mechanism to open and close retractable floor 305 is constructed in this way, when lever 330 is in the position indicated by solid lines, retractable floor 305 will be parallel to central cabin floor 326, and the opening through which elevator 315 travels will be sealed. When lever 330 rotates clockwise until it reaches the position indicated by dotted lines, retractable floor 305 will open up to create a passageway for elevator 315.

Figure 15:
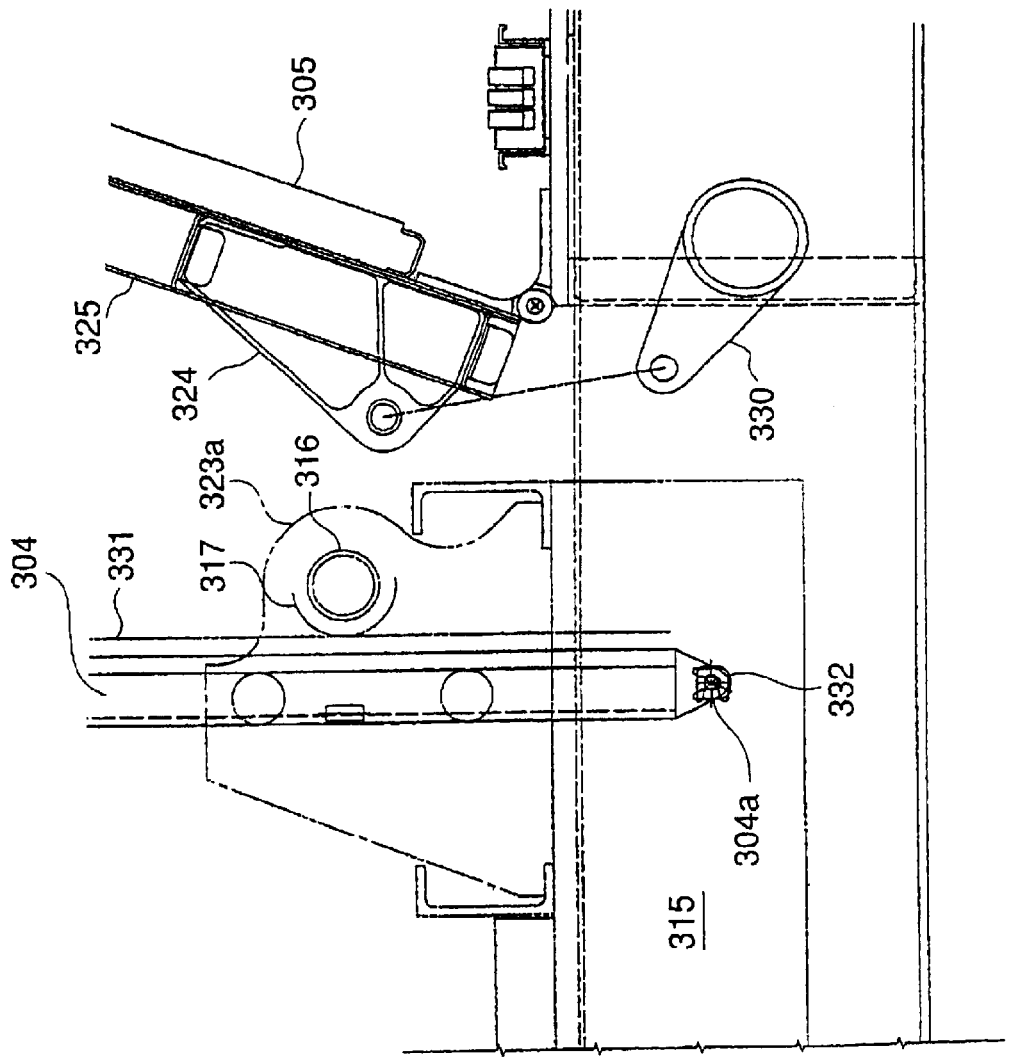
FIG. 15 is an illustration to explain the connecting member provided at the bottom of the guide rail according to the fourth preferred embodiment.

FIG. 15 is a close-up view of portion C in FIG. 8(b). After retractable floor 305 opens up, the ends of guide rails 304 lock into lower horizontal partition 347, which forms central cabin floor 326 in central cargo cabin 321 (See FIG. 8). Snap rings 332 are mounted on the lower horizontal partition 347 in such a way that they can rotate. Pins 304a go into the lower ends of guide rails 304. The pins 304a, which have rotated from the upper left hand portion of FIG. 15, are complemented by snap rings 332. At this time a mechanism which is not shown rotates snap rings 332 90° either electrically or mechanically to a position in which they are locked.

Figure 21:
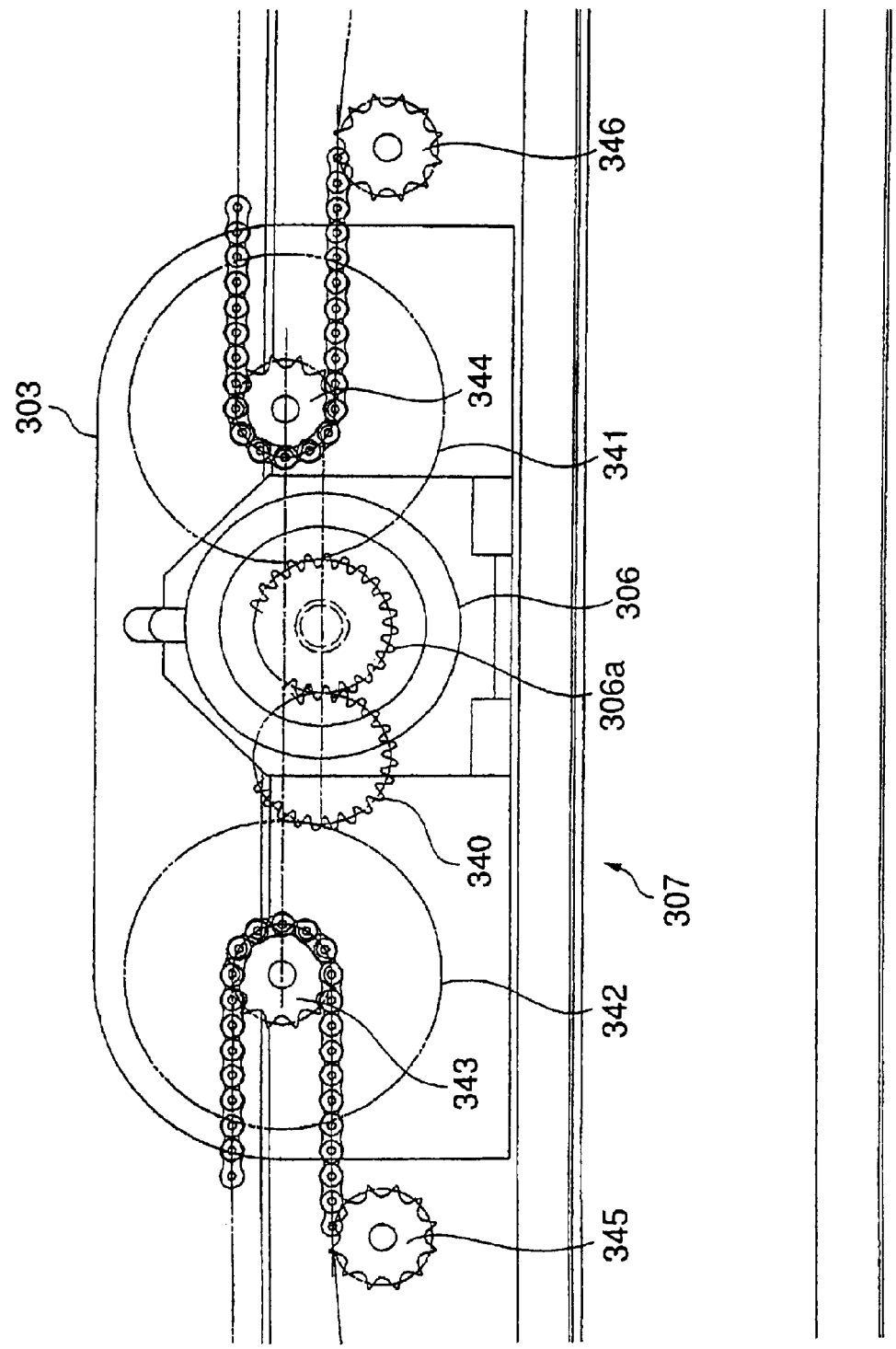
FIG. 21 is a third illustration to explain the driving method for the elevator according to the fourth preferred embodiment.

When motor 306 shown in FIG. 21 causes elevator gears 317, which engages with racks 331, to rotate, elevator 315 descends to the position shown in the drawing.

Figure 16:
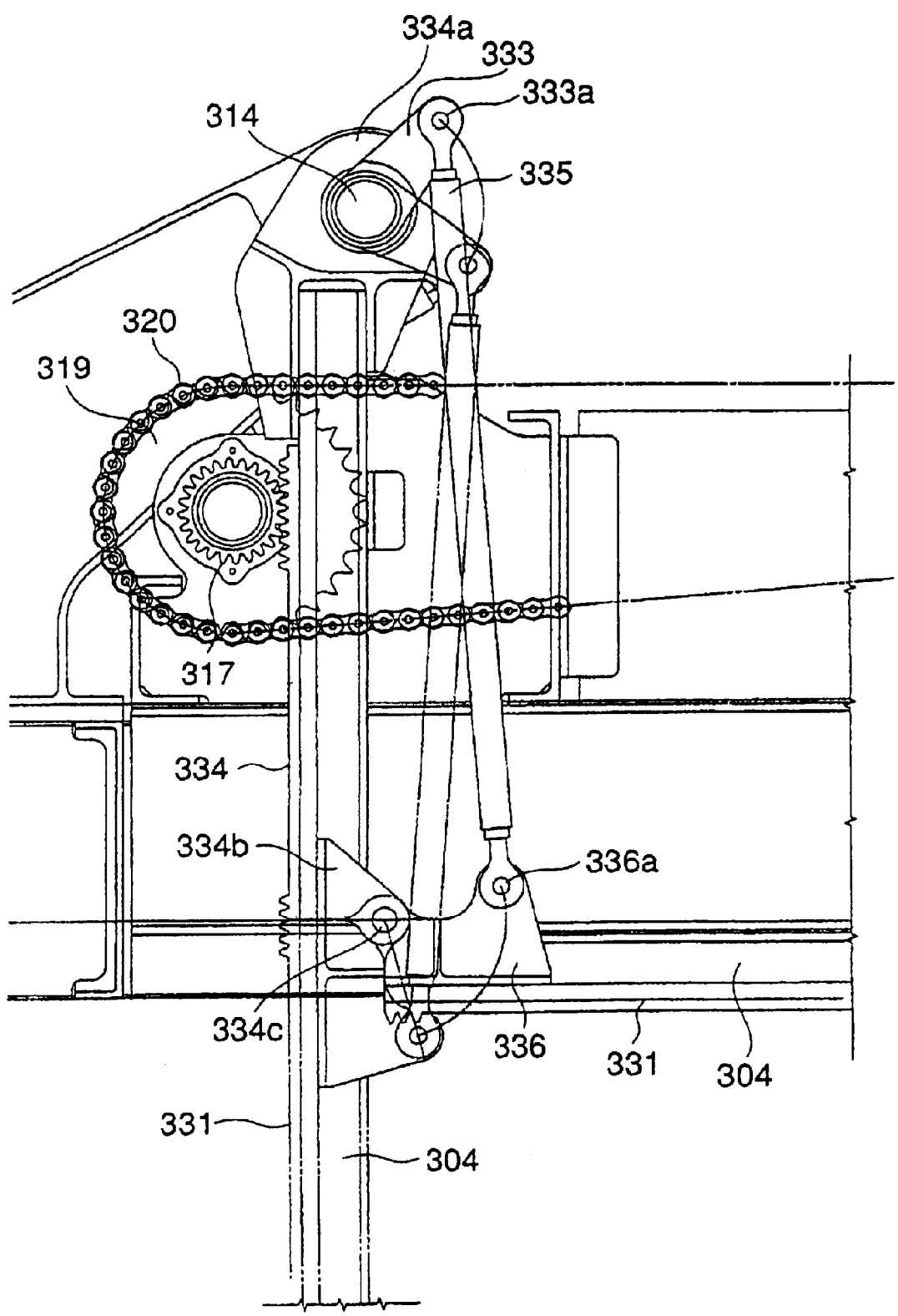
FIG. 16 is an illustration to explain how to store the guide rail according to the fourth preferred embodiment.

FIG. 16 is a close-up view of portion D in FIG. 8(b). It illustrates how guide rails 304 and racks 331 appear both when stored and deployed. Support arm 333, which is fixed to support rod 314, has a small opening 333a in its end. Connector end 334b on the lower end of rack 334, which is suspended from rack head 334a, has a hole 334c in it. Connector end 336, which rotates around the hole 334c, is mounted in such a way that it is free to rotate. The connector end 336 is fixed to the end of guide rail 304, which has racks 331.

The connector end 336 has a hole 336a in it. Connecting rod 335, which has pins that go through the hole 336a and hole 333a on the end of the support arm 333 in such a way that they can rotate, is placed between the two holes.

Figure 18:
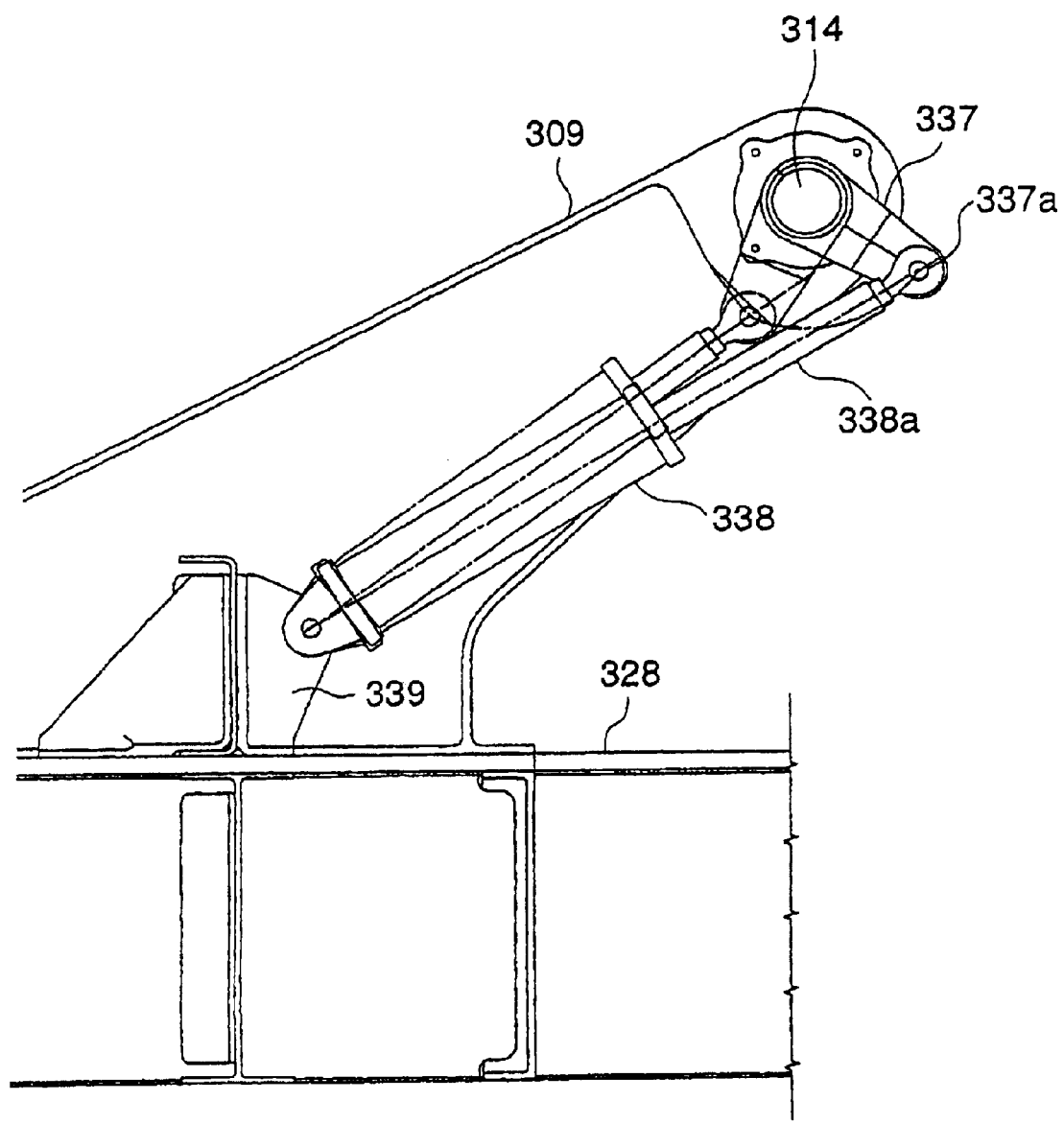
FIG. 18 is an illustration to explain how to store and descend the guide rail according to the fourth preferred embodiment.
Figure 19:
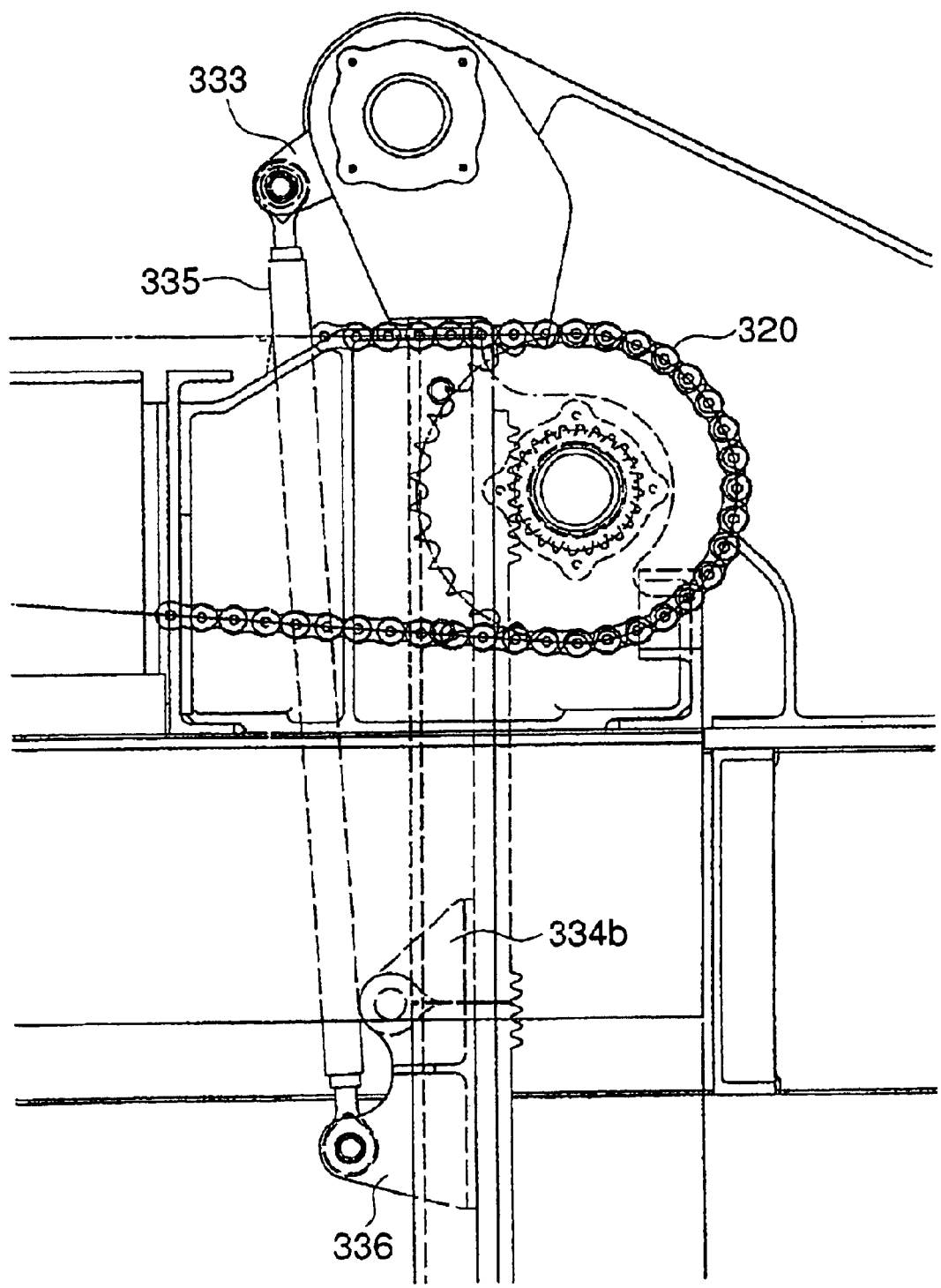
FIG. 19 is a first illustration to explain the driving method for the elevator according to the fourth preferred embodiment.
Figure 20:
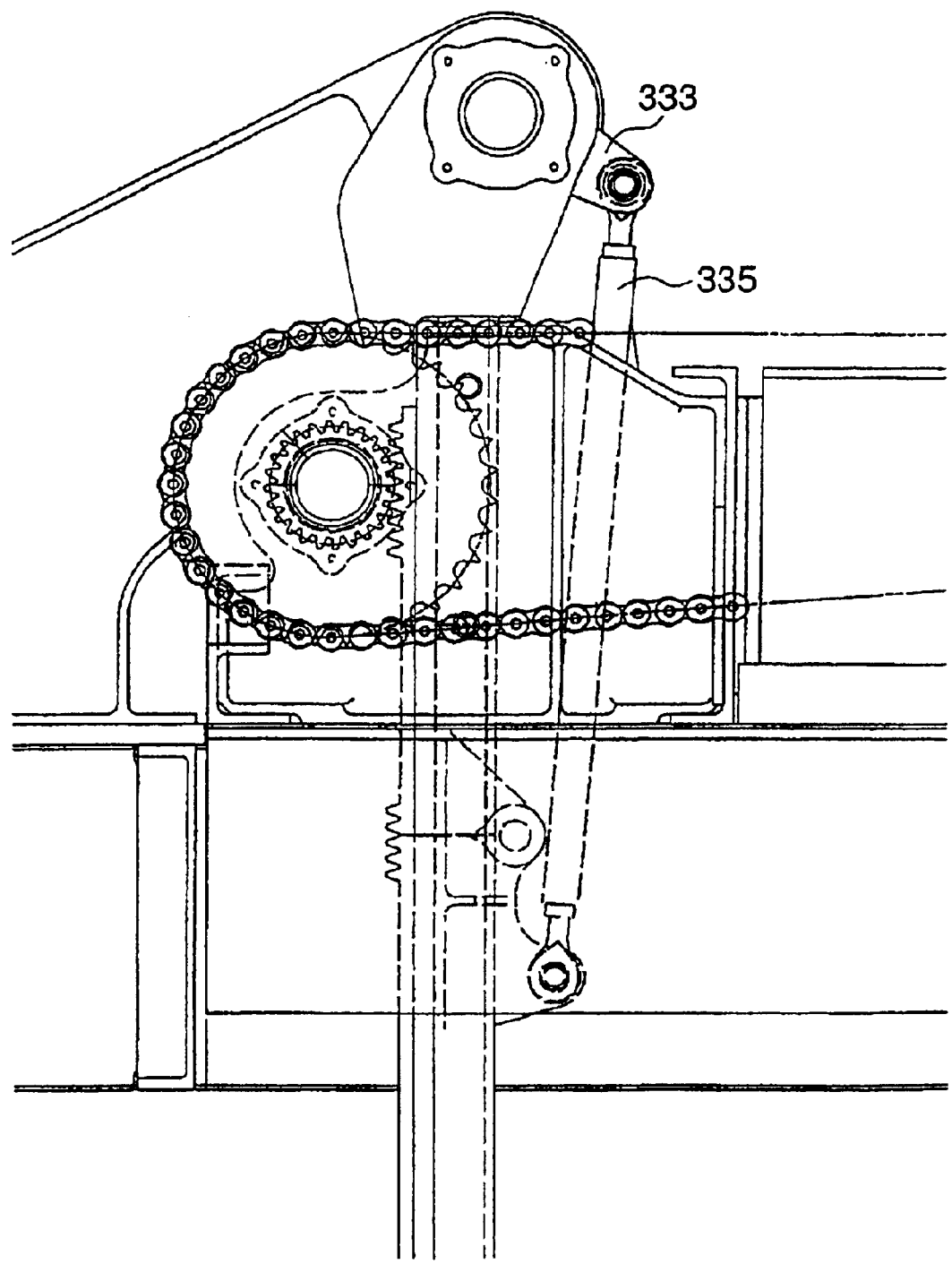
FIG. 20 is a second illustration to explain the driving method for the elevator according to the fourth preferred embodiment.

As can be seen in FIG. 18, one end of actuator 338 is supported in such a way that it can rotate on mount 339 between support rod receives 309, 309. On the other end of the actuator is movable rod 338a, which expands and contracts. Support arm 337 is attached to support rod 314. End pin 337a of the movable rod 338a is connected to the end of the support arm 337 so that the support arm can rotate around the pin.

In FIG. 18, when actuator 338 drives it, the extended movable arm 338a contracts, and support rod 314 rotates clockwise. When support rod 314 rotates clockwise in FIG. 16, guide rails 304 and racks 331, which were stowed horizontally, rotate clockwise with hole 334c as their rotary shaft until they are vertical.

Figure 17:
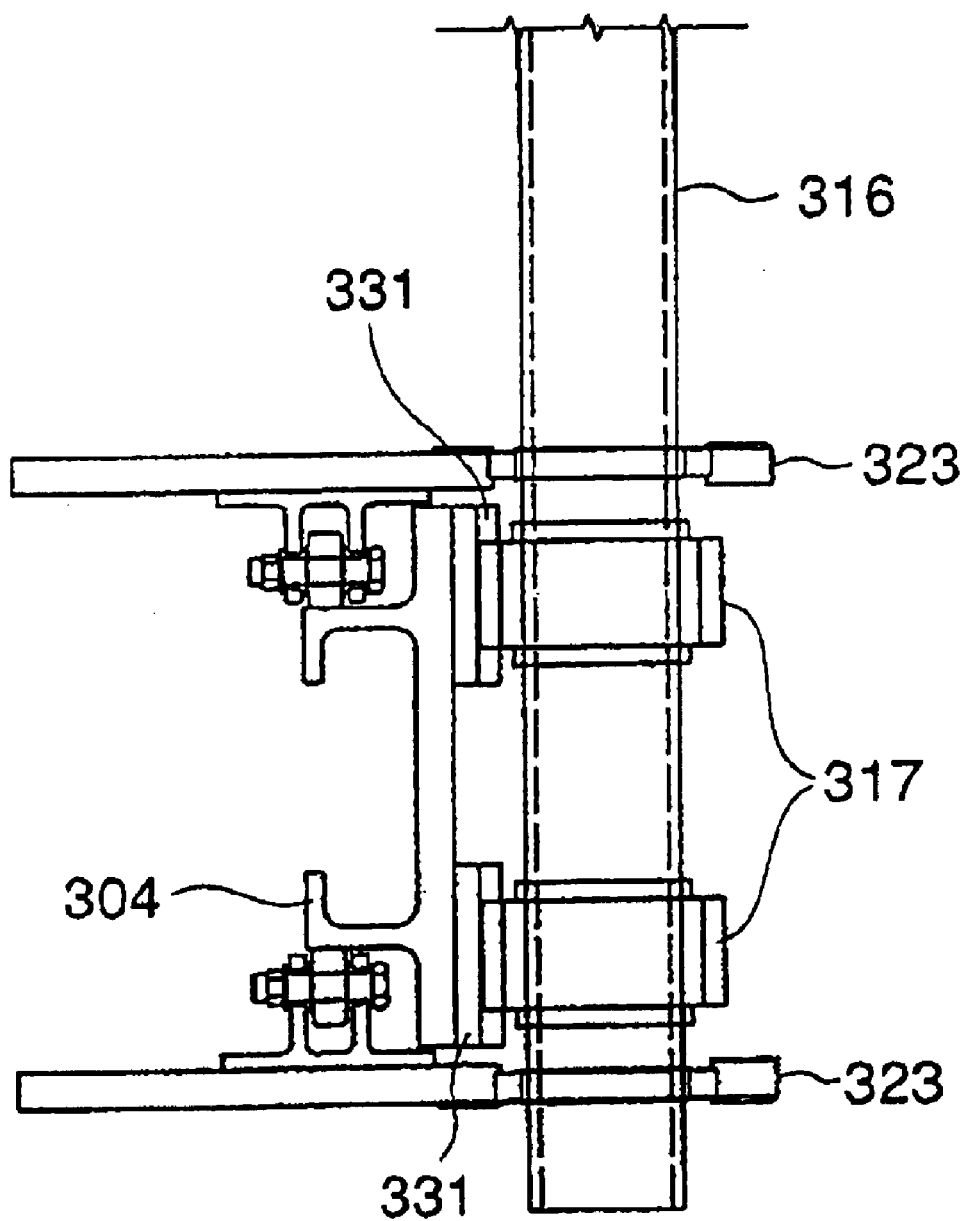
FIG. 17 is an illustration to explain the main components of the guide rail according to the fourth preferred embodiment.

A detailed view of the gear shaft 316 and gears 317 shown in FIG. 9 is presented in FIG. 17. Gears 317 are arranged on gear shaft 316 in two locations which are a specified distance apart. Racks 331, 331 which engage with gears 317, 317 are placed in two locations on guide rail 304.

FIG. 21 is an enlarged view of segment E in FIG. 8(b). Motor 306 is placed in drive source 303. Gear unit 307 consists of gear 306a, which is fixed to the rotary shaft of the motor; intermediate gear 340; and gears 341 and 342. Chains 320, 320 are hung between sprockets 343 and 344, which are coaxial with the rotary shafts of gears 341 and 342, and sprockets 319 near the rack.

The rotary drive force generated by motor 306 is transmitted to sprockets 319, 319 by chains 320. Gear shaft 316 is made to rotate, and elevator gears 317 rotate. When elevator gears 317 descend, elevator 315 also descends, and the containers 313 loaded on the elevator descend along with it.

As has been explained above, the fourth preferred embodiment has a drive source and gears connected to the drive source on the elevator. The cargo cabin is divided by partitions, within which are stowed a guide device to drive the elevator and racks which engage with the gears. Before the elevator is driven, the mechanisms related to its movement, including the device to guide the elevator and the racks which engage with the gears, are deployed into the area traveled by the elevator. When the elevator is not in service, the mechanisms are stowed in the partition. There are no mechanical parts in the cargo cabin, so the personnel can have a safer work environment.

Figure 22:
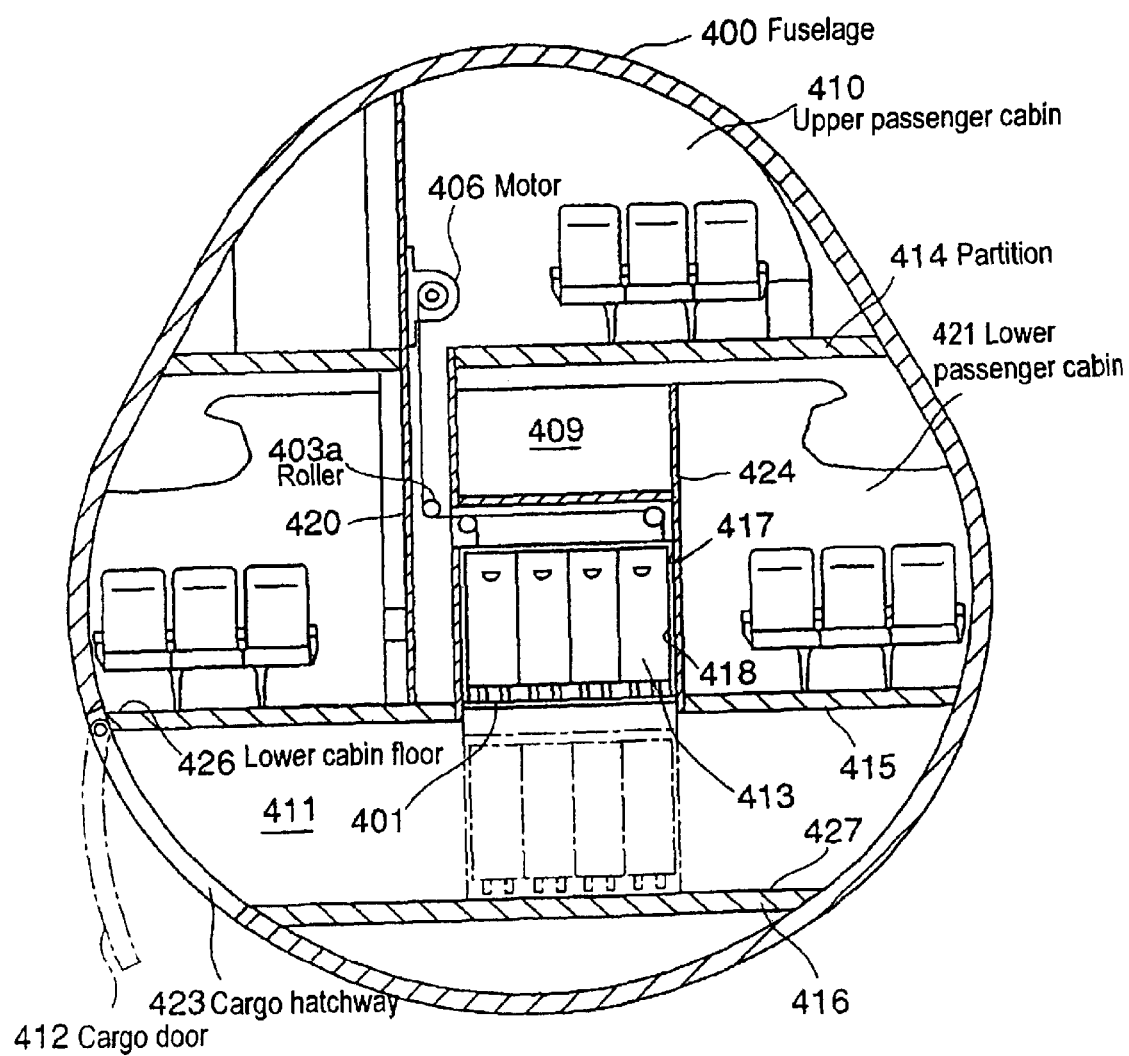
FIG. 22 is a rough cross section of the aircraft according to the fifth preferred embodiment.
Figure 23:
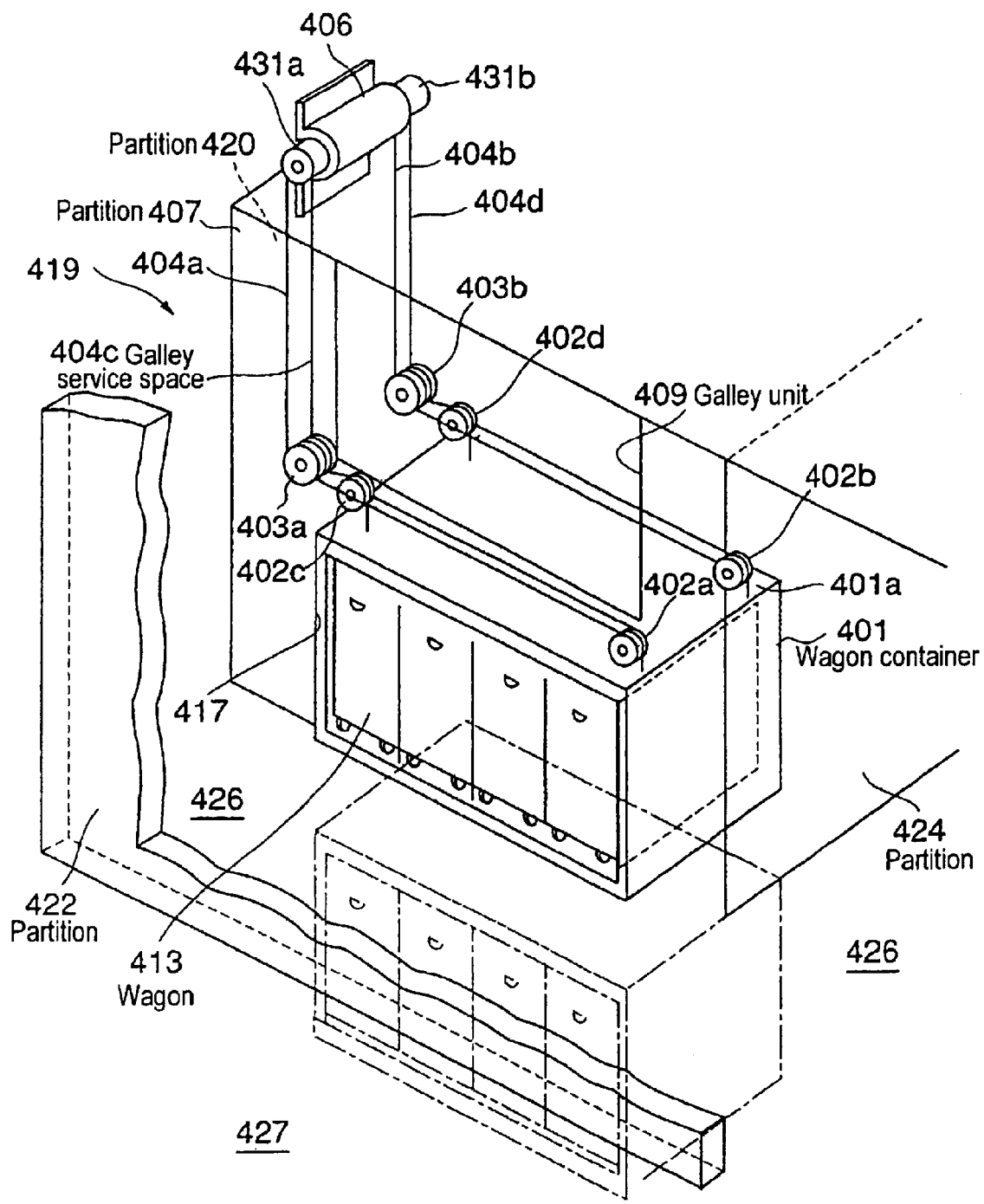
FIG. 23 is a perspective drawing of the elevator according to the fifth preferred embodiment.

FIG. 22 and FIG. 23 illustrate the fifth preferred embodiment. FIG. 22 is a rough sketch of cross section of the passenger aircraft according to the fifth preferred embodiment, and FIG. 23 is a perspective drawing of the elevator according to the fifth preferred embodiment.

The interior of the fuselage 400 is divided into a plurality of cabins, upper passenger cabin 410, lower passenger cabin 421, and cargo cabin 411 by the horizontal partitions 414, 415, and 416.

Figure 24:
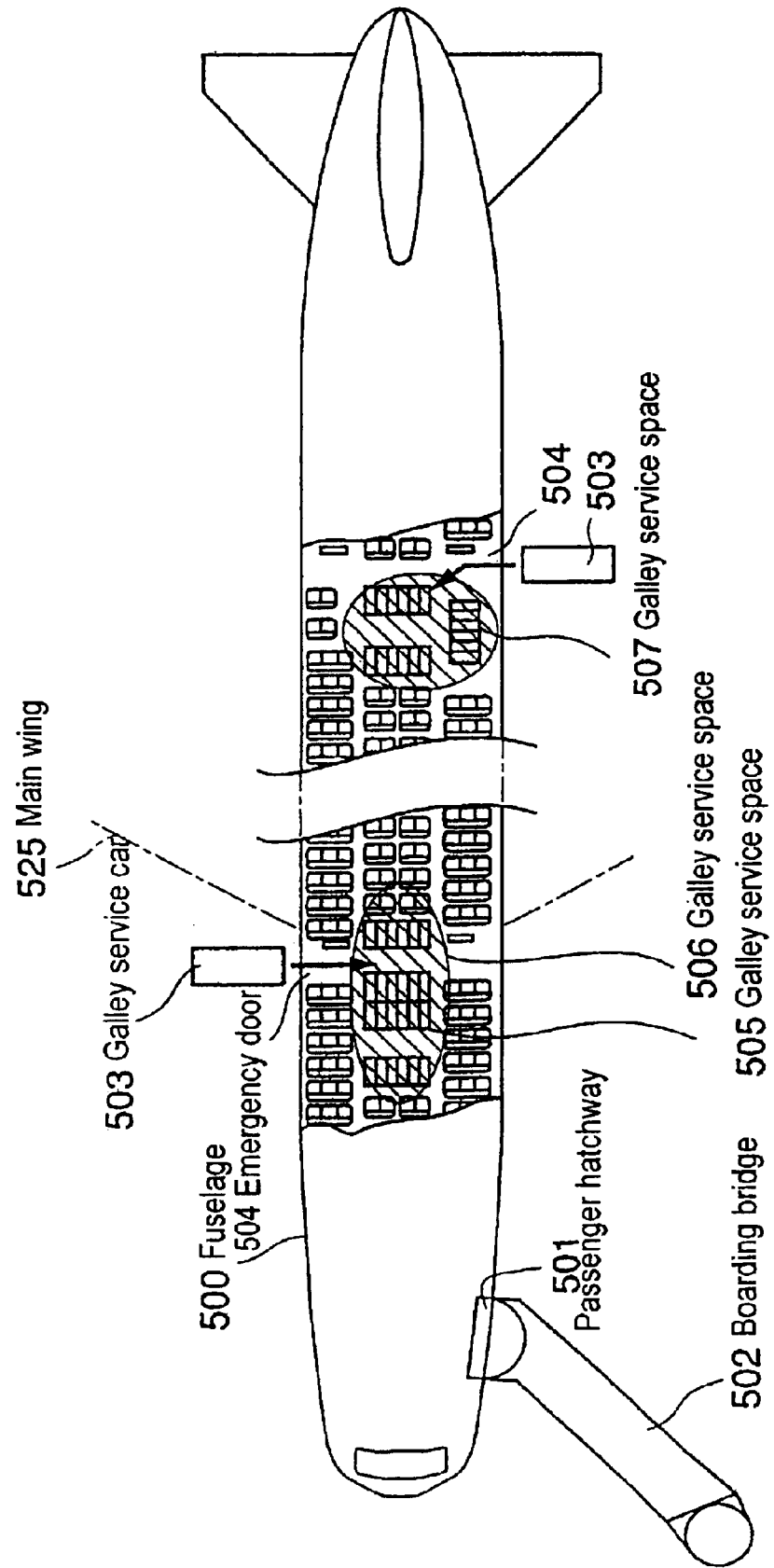
FIG. 24 is a partial cross plain section of an aircraft according to the prior art.
Figure 25:
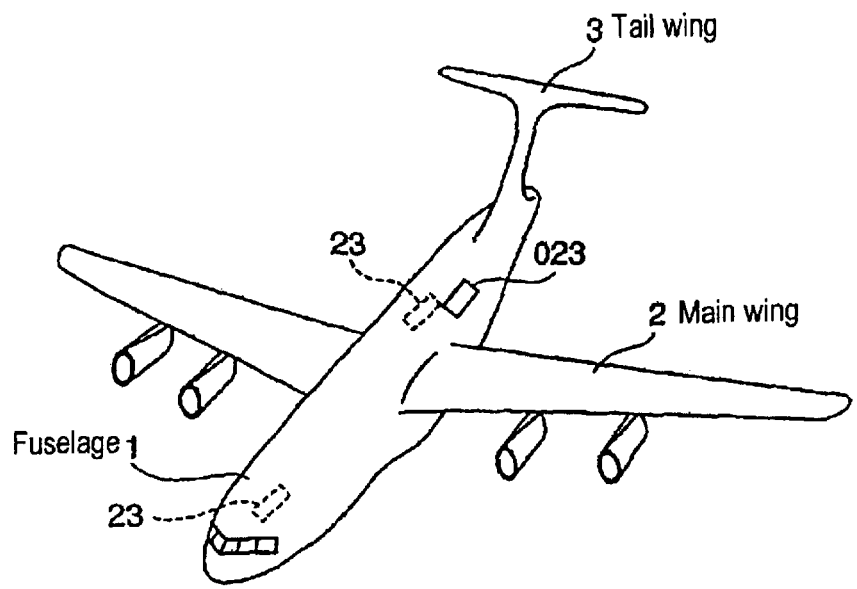
FIG. 25 is a rough perspective drawing of a cargo aircraft according to the prior art.
Figure 26:
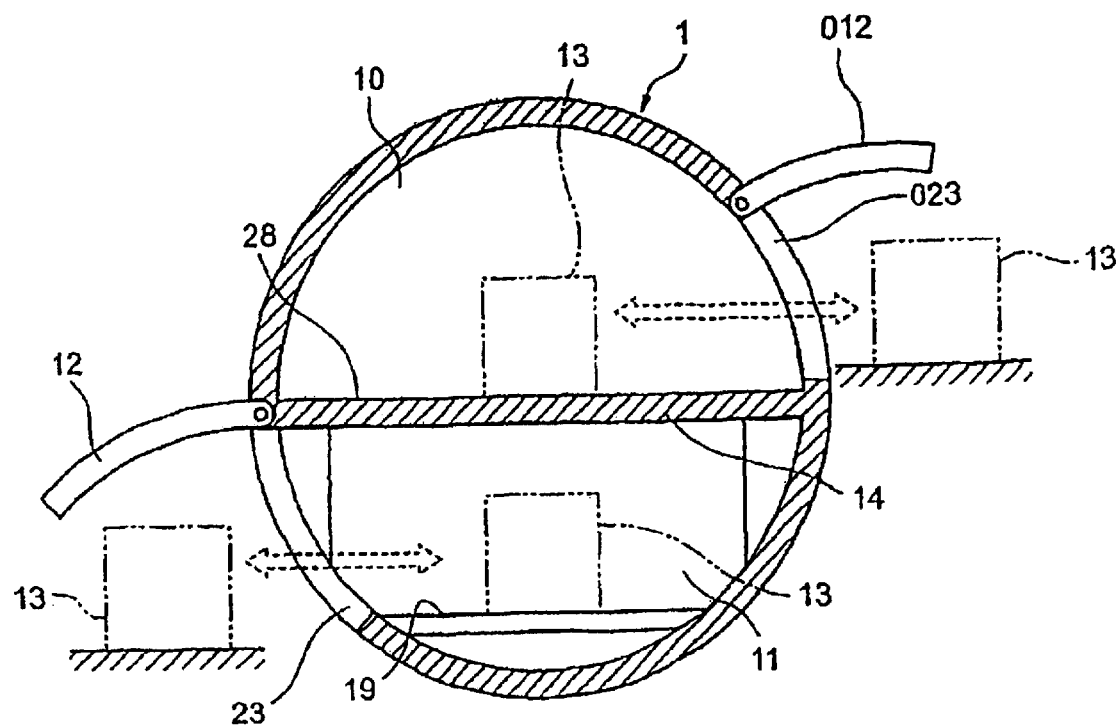
FIG. 26 is a cross section of a cargo aircraft according to the prior art.

As shown in FIG. 24, lower passenger cabin 421 is accessible through passenger hatchway 501. Cargo cabin 411 is accessible through cargo hatchway 423 (cargo entrance) by opening cargo door 412 for bringing the cargo in and out.

On the lower cabin floor 426 of lower passenger cabin 421, there is a galley service space 419 in which drinks are warmed up and special food menus are prepared for the passengers. The galley service space 419 is located in the passenger cabin which is accessible by the passengers. The galley service spaces are provided on the lower cabin floor 426 at both sides of the walkway in the aircraft, which is located at the front part of the aircraft.

In the galley service space 419, there are two open spaces as shown in FIG. 23, the first space is for galley unit 409 at the upper portion of galley partition 407 in which a microwave for heating and a refrigerator are provided, the second space is for wagon container parking space 417 at the lower portion of galley partition to park the wagon container 401 for wagons, which is elevated up and down.

The wagon container parking space 417 has an opening on the lower cabin floor 426 through which the cargo cabin 411 is connected. Cargo cabin 411 is located under the lower passenger cabin. In wagon container parking space 417, wagon container 401 can be provided which loads a plurality of wagons 413. Wagon container 401 can be elevated up and down, and it stops on the floor of cargo cabin 411.

The following is an explanation of the drive mechanism for wagon container 401. At the 4 corners of upper portion 401a of wagon container 401, 4 ropes are fixed which are 404a, 404b, 404c and 404d. Near the upper portion 401a, 4 rollers are provided, roller 402a for rolling rope 404a, roller 402b for rolling rope 404b, roller 402c for rolling rope 404c, and roller 402d for rolling rope 404d.

In the upper passenger cabin above the rollers 403a and 403b, motor 406 is provided and bobbins 431a and 431b are fixed at both sides of the rotation shaft of motor 406.

The bobbins 431a and 431b have two winding sections to wind up the two ropes, which are provided side by side. Bobbin 431a connects with the ends of rope 404a and 404c. Bobbin 431b connects with the ends of rope 404b and 404d.

The other ends of rope 404a, 404b, 404c and 404d are connected with the upper corner portions 401a of wagon container 401 via 403a and 402a, 403b and 402b, 403a and 402c, and 403b and 402d respectively.

With this configuration, if motor 406 winds up or lets out the rope 404, they elevate up or down the wagon container 401 respectively.

Wagons 413 can be delivered-out from galley service space 419 to cargo cabin 411 by loading the wagons into wagon container 401 when it is in the galley service space and lowing the wagon container 401 by reversing the rotation of motor 406 down to the cargo cabin 411. The wagons 413 are then delivered-out through cargo hatchway 423. It is also possible to deliver-in the new wagons 413 loaded with the necessary items to galley service space 419 from cargo hatchway 423 by loading the new wagons in wagon container 401.

According to the fifth preferred embodiment mentioned above, it is no longer necessary to deliver the wagons 413 in and out from the galley service space to the exterior of the aircraft through the passenger floor. It is possible to deliver the wagons 413 in and out by the wagon container from the galley service space to the exterior. Since the wagons 413 can be delivered in and out through cargo hatchway 423 of cargo cabin 411, it is possible to deliver the wagons during the time passengers are getting off the aircraft. It is, therefore, no longer necessary to exchange the new and old wagons after the passengers leave the aircraft as a conventional way, and it can be processed during the time passengers are deplaning. This can shorten the parking time of the aircraft, and more flights can be scheduled in the same length of time. This can shorten the waiting time of the passengers, and also improve the profitability of the airlines and convenience of the passengers.

EFFECTS OF THE INVENTION

As mentioned above, the aircraft of this invention provided with multi-level cabins functioning as a cargo cabin or passenger cabin is distinguished by the configuration which comprises, a first cabin provided with a cargo hatchway which is opened and closed by a cargo door on a fuselage, the cargo door facing towards the cargo cabin; a second cabin which lacks the cargo hatchway, the second cabin being positioned directly above or under the first cabin; and an elevator to convey a cargo item, moved into the first cabin through the cargo hatchway, to the second cabin, and to convey back the conveyed cargo item from the second cabin to the first cabin, thereby the cargo item is moved between the exterior of the aircraft and the second cabin.

It is, therefore, possible in this aircraft according to this invention, to move the cargo items into and from the aircraft through the existing cargo hatchway (hatchway used only for cargos). Since the elevator can move the cargo items between the first cabin provided with a cargo hatchway which is opened and closed by a cargo door on a fuselage, and the second cabin which lacks said cargo hatchway, it obviates the need to provide a new cargo hatchway which lowers the strength of the fuselage. The number of cargo hatchways and doors can be reduced without affecting the ability to load and unload cargo on every level. This arrangement lowers the cost of the aircraft.

When a passenger aircraft is being converted to a cargo aircraft, this arrangement makes it unnecessary to add on any new hatchways and doors beyond what the plane originally had. This significantly reduces both the number of processes required to remodel the plane and the cost of remodeling it.

More specifically, this invention allows us to provide a cargo hatchway closed by a door in the lowest cargo cabin only. Cargo can then be loaded into the plane through the cargo hatchway and then moved vertically within the plane to the upper cargo cabins by means of an elevator. This obviates the need to provide cargo hatchways closed by doors in both the upper and lower cargo cabins, as was the case in the prior art. Cargo to be stowed in both the lower and upper cargo cabins can be loaded and unloaded via a single cargo hatchway.

Since cargo doors must be of the same thickness and made of the same materials as the fuselage, they are extremely massive. They must also be rigorously sealed. This invention allows us to reduce the number of such doors to one or the minimum feasible number, thus reducing the number of assembly processes required to construct the plane and the cost of materials. Since in a three-level cargo plane the highest level will generally be ten meters off the ground, loading the cargo from outside the plane onto the central level and then transferring it by elevator inside the plane will enhance the safety of the personnel employed in loading the cargo.

When a passenger aircraft is being converted into a cargo aircraft, the existing cargo hatchway and door into the lower cargo cabin can be used. An elevator can be provided near the hatchway or elsewhere in the cabin on the lower level, and the cargo loaded through the existing cargo hatchway can be moved vertically by means of the elevator. It can thus be easily transported to the upper cargo cabin, so there is no need to provide an additional hatchway with a door. This reduces both the number of processes required to remodel the plane and the cost.

According to this invention, a galley service space is provided in the second cabin used as a passenger cabin, and the elevator conveys a wagon container filled with wagon cargos between the galley service space and the first cabin. With this elevator, the wagon cargos are moved in and out from the wagon container in the galley service space, and the wagon container is conveyed between the exterior of the aircraft and the galley service space. This configuration makes it possible to move the wagons through the cargo hatchway provided in the cargo cabin. It can move the wagons to the galley service space in the second cabin by the elevator. It is no longer necessary to move the wagons on the passenger floor as the prior art. It is, thus, possible to deliver the wagons during the time passengers are deplaning. It is, therefore, no longer necessary to exchange the new and old wagons after the passengers leave the aircraft as a conventional way, and it can be processed during the time passengers are deplaning. This can shorten the parking time of the aircraft, and more flights can be scheduled in the same length of time. This can shorten the waiting time of the passengers, and also improve the profitability of the airlines and convenience of the passengers. Various other effects are also achieved.

What is claimed is:

1. A cargo aircraft provided with multi-level cargo cabins each being divided by at least one horizontal partition running along a length of a fuselage of said cargo aircraft, an upper most one of the multi-level cargo cabins being formed by one of the at least one horizontal partition and a ceiling of the fuselage, and a lower most one of the multi-level cargo cabins being formed by one of the at least one horizontal partition and a lower cabin floor of the fuselage, said cargo aircraft comprising:

multi-level cargo cabins;

at least one cargo hatchway operable to be opened and closed by a cargo door, said cargo door being provided on the fuselage at the lower most one of said multi-level cargo cabins;

an elevator operable to convey a cargo item vertically between said multi-level cargo cabins through an opening of the at least one horizontal partition, wherein the cargo item can be conveyed into one of said multi-level cargo cabins via said at least one cargo hatchway which is opened and closed by said cargo door; and a horizontal conveyor provided on a floor of each of said multi-level cargo cabins and being operable to convey the cargo item in a horizontal direction, wherein said elevator faces said at least one cargo hatchway and is operable to convey the cargo item vertically to the floor of each of said multi-level cargo cabins, and wherein said horizontal conveyor is provided in a proximity of the opening for said elevator;

wherein said elevator comprises:

a cargo stage upon which the cargo item can be loaded and vertically conveyed, said cargo stage being operable to be folded down during a flight of said cargo aircraft so as to form a flat floor which is the same level as a cabin floor;

cross links being connected to a bottom of said cargo stage, and being vertically expandable;

a hydraulic cylinder connected with lower ends of said cross links and being operable to expand or contract said cross links so as to move said cargo stage vertically; and rollers provided on lower ends of said cross links and which are free to rotate, wherein said rollers are operable to run on rails oriented on a floor of the lower most one of said multi-level cargo cabins to enable said elevator to move length-wise.

2. A cargo aircraft provided with multi-level cargo cabins each being divided by at least one horizontal partition running along a length of a fuselage of said cargo aircraft, an upper most one of the multi-level cargo cabins being formed by one of the at least one horizontal partition and a ceiling of the fuselage, and a lower most one of the multi-level cargo cabins being formed by one of the at least one horizontal partition and a lower cabin floor of the fuselage, said cargo aircraft comprising:

multi-level cargo cabins;

at least one cargo hatchway operable to be opened and closed by a cargo door, said cargo door being provided on the fuselage at the lower most one of said multi-level cargo cabins;

an elevator operable to convey a cargo item vertically between said multi-level cargo cabins through an opening of the at least one horizontal partition, wherein the cargo item can be conveyed into one of said multi-level cargo cabins via said at least one cargo hatchway which is opened and closed by said cargo door; and a horizontal conveyor provided on a floor of each of said multi-level cargo cabins and being operable to convey the cargo item in a horizontal direction, wherein said elevator faces said at least one cargo hatchway and is operable to convey the cargo item vertically to the floor of each of said multi-level cargo cabins, and wherein said horizontal conveyor is provided in a proximity of the opening for said elevator;

wherein said multi-level cargo cabins comprise said lower-most cargo cabin, a central cargo cabin, and said upper most cargo cabin, and wherein said elevator comprises:

a cargo stage upon which the cargo item can be loaded and vertically conveyed;

a plurality of ropes connected to said cargo stage and a plurality of pulleys from which said plurality of ropes are hung, said plurality of ropes and pulleys being operable to vertically convey said cargo stage between said multi-level cargo cabins; and a drive mechanism connected to said plurality of ropes which is operable to vertically convey said cargo stage by winding or letting out said plurality of ropes, said drive mechanism being provided in the central cargo cabin.

3. A cargo aircraft provided with multi-level cabins each being divided by at least one horizontal partition running along a length of a fuselage of said cargo aircraft, an upper most one of the multi-level cargo cabins being formed by one of the at least one horizontal partition and a ceiling of the fuselage, and a lower most one of the multi-level cargo cabins being formed by one of the at least one horizontal partition and a lower cabin floor of the fuselage, said cargo aircraft comprising:

multi-level cargo cabins;

at least one cargo hatchway operable to be opened and closed by a cargo door, said cargo door being provided on the fuselage at the lower most one of said multi-level cargo cabins;

an elevator operable to convey a cargo item vertically between said multi-level cargo cabins through an opening of the at least one horizontal partition, wherein the cargo item can be conveyed into one of said multi-level cargo cabins via said at least one cargo hatchway which is opened and closed by said cargo door; and a horizontal conveyor provided on a floor of each of said multi-level cargo cabins and being operable to convey the cargo item in a horizontal direction, wherein said elevator faces said at least one cargo hatchway and is operable to convey the cargo item vertically to the floor of each of said multi-level cargo cabins, and wherein said horizontal conveyor is provided in a proximity of the opening for said elevator;

wherein said elevator comprises:

a driving device operable to drive said elevator and a gear to be driven by said driving device;

a plurality of racks which are operable to be interlocked with said gear, said racks being folded in a cabin floor of one of said multi-level cargo cabins and being unfolded upwards from beneath the cabin floor in a vertical direction before said elevator is activated and engaged with said gear; and guide rails upon which said plurality of racks are provided, said guide rails operable to be stored in the cabin floor and to be taken out to support said plurality of racks.

4. A cargo aircraft provided with multi-level cargo cabins each being divided by at least one horizontal partition running along a length of a fuselage of said cargo aircraft, an under most one of the multi-level cargo cabins being formed by one of the at least one horizontal partition and a ceiling of the fuselage, and a lower most one of the multi-level cargo cabins being formed by one of the at least one horizontal partition and a lower cabin floor of the fuselage, said cargo aircraft comprising:

multi-level cargo cabins;

at least one cargo hatchway operable to be opened and closed by a cargo door, said cargo door being provided on the fuselage at the lower most one of said multi-level cargo cabins;

an elevator operable to convey a cargo item vertically between said multi-level cargo cabins through an opening of the at least one horizontal partition, wherein the cargo item can be conveyed into one of said multi-level cargo cabins via said at least one cargo hatchway which is opened and closed by said cargo door; and a horizontal conveyor provided on a floor of each of said multi-level cargo cabins and being operable to convey the cargo item in a horizontal direction, wherein said elevator faces said at least one cargo hatchway and is operable to convey the cargo item vertically to the floor of each of said multi-level cargo cabins, and wherein said horizontal conveyor is provided in a proximity of the opening for said elevator;

wherein said aircraft comprises:

a lower most cargo cabin, an upper most cargo cabin, and a central cabin which does not function as a cargo cabin, wherein a galley service space is provided in said central cabin which is used as a passenger cabin, and wherein said elevator is operable to convey wagons, which are to be used in said galley service space, in and out from said at least one cargo door provided on said lower most cargo cabin simultaneously with disembarkation of passengers.

* * * * *